US009612967B1

(12) United States Patent
Peterson et al.

(10) Patent No.: US 9,612,967 B1
(45) Date of Patent: Apr. 4, 2017

(54) CACHE LOAD BALANCING BY RECLAIMABLE BLOCK MIGRATION

(71) Applicant: Dell Products, L.P., Round Rock, TX (US)

(72) Inventors: Scott Peterson, Beaverton, OR (US); Noelan Olson, Portland, OR (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/866,037

(22) Filed: Sep. 25, 2015

(51) Int. Cl.
*G06F 12/00* (2006.01)
*G06F 12/0875* (2016.01)
*G06F 13/00* (2006.01)
*G06F 13/28* (2006.01)
*G06F 9/50* (2006.01)

(52) U.S. Cl.
CPC ........ *G06F 12/0875* (2013.01); *G06F 9/5083* (2013.01); *G06F 2212/601* (2013.01)

(58) Field of Classification Search
CPC .............. G06F 12/0875; G06F 9/5083; G06F 2212/601
See application file for complete search history.

(56) References Cited

U.S. PATENT DOCUMENTS

| 6,078,994 | A  * | 6/2000  | Carey       | G06F 12/121 |
|           |      |         |             | 711/133     |
| 6,845,430 | B2 * | 1/2005  | Hopeman     | G06F 12/084 |
|           |      |         |             | 707/999.202 |
| 9,081,627 | B1 * | 7/2015  | Blanding    | G06F 9/52   |
| 2006/0242382 | A1 * | 10/2006 | Griess    | G06F 3/0608 |
|           |      |         |             | 711/170     |
| 2009/0144388 | A1 * | 6/2009  | Gross     | G06F 12/0813 |
|           |      |         |             | 709/213     |
| 2009/0198952 | A1 * | 8/2009  | Khmelnitsky | G06F 12/0246 |
|           |      |         |             | 711/206     |
| 2011/0138147 | A1 * | 6/2011  | Knowles   | G06F 9/5016 |
|           |      |         |             | 711/170     |
| 2012/0072656 | A1 * | 3/2012  | Archak    | G06F 17/30132 |
|           |      |         |             | 711/104     |
| 2014/0047062 | A1   | 2/2014  | Kruger et al. |         |
| 2014/0047181 | A1   | 2/2014  | Peterson et al. |       |
| 2014/0047185 | A1   | 2/2014  | Peterson et al. |       |
| 2014/0047193 | A1   | 2/2014  | Gross et al. |          |
| 2016/0103764 | A1 * | 4/2016  | Banerjee   | G06F 3/061 |
|           |      |         |             | 711/129     |

* cited by examiner

*Primary Examiner* — Mark Giardino, Jr.
(74) *Attorney, Agent, or Firm* — Fogarty LLP

(57) ABSTRACT

Systems and methods for cache load balancing by reclaimable block migration are described. In some embodiments, a computer system may include a processor; and a memory coupled to the processor, the memory having program instructions stored thereon that, upon execution by the processor, cause the computer system to: maintain a first list of reclaimable blocks that reside in a first caching device and a first advertised age for the oldest reclaimable block of the first list; maintain a second list of reclaimable blocks that reside in a second caching device and a second advertised age for the oldest reclaimable block of the second list; determine that the second advertised age is older than the first advertised age; and cause the oldest reclaimable block on the first list to be migrated from the first caching device to the second caching device.

17 Claims, 6 Drawing Sheets

CACHE LOAD BALANCING BY RECLAIMABLE BLOCK MIGRATION

FIELD

This disclosure relates generally to computer systems, and more specifically, to systems and methods for cache load balancing by reclaimable block migration.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage a shared, distributed cache.

SUMMARY

Embodiments of systems and methods for managing secured storage devices in an Information Handling System (IHS) are described herein. In an illustrative, non-limiting embodiment, a computer system may include a processor; and a memory coupled to the processor, the memory having program instructions stored thereon that, upon execution by the processor, cause the computer system to: maintain a first list of reclaimable blocks that reside in a first caching device and a first advertised age for the oldest reclaimable block of the first list; maintain a second list of reclaimable blocks that reside in a second caching device and a second advertised age for the oldest reclaimable block of the second list; determine that the second advertised age is older than the first advertised age; and cause the oldest reclaimable block on the first list to be migrated from the first caching device to the second caching device.

In various embodiments, all reclaimable blocks have no read or write references, are clean, and have no corresponding replica blocks. The first advertised age may indicate how long ago the oldest reclaimable block of the first list became reclaimable, and the second advertised age may indicate how long ago the oldest reclaimable block of the second list became reclaimable.

The computer system may determine that a difference between the first and second advertised ages is greater than a threshold time value prior to the migration. The program instructions may further cause the computer system to add a reference to the migrated reclaimable block to the second list and to remove a reference to the migrated reclaimable block from the first list. In some cases, the reference to the migrated reclaimable block is added to the second list among other references to other reclaimable blocks in order by age. Additionally or alternatively, the second caching device may discard the oldest reclaimable block of the second list prior to the migration in response to the second caching device being full.

The computer system may determine that the first caching device has a storage utilization above a minimum threshold level prior to the migration. Additionally or alternatively, the computer system may determine that the second caching device has a storage utilization below a maximum threshold level prior to the migration. The program instructions, upon execution by the processor, may further cause the computer system to update the first and second advertised ages over time.

In another illustrative, non-limiting embodiment, a memory device may have program instructions stored thereon that, upon execution by a processor of a computer system, cause the computer system to: maintain a first list of reclaimable blocks that reside in a first caching device and a second list of reclaimable blocks that reside in a second caching device, wherein all reclaimable blocks have no read or write references, are clean, and have no corresponding replica blocks; determine that the second caching device is under-utilized with respect to the first caching device; migrate at least one reclaimable block from the first caching device to the second caching device; and update the first and second lists of reclaimable blocks. For example, the second caching device may be under-utilized with respect to the first caching device when it has less available storage space than the second caching device.

The program instructions may cause the computer system to, prior the migration: maintain a first advertised age for the oldest reclaimable block of the first list, wherein the first advertised age indicates how long ago the oldest reclaimable block of the first list became reclaimable; maintain a second advertised age for the oldest reclaimable block of the second list, wherein the second advertised age indicates how long ago the oldest reclaimable block of the second list became reclaimable; and determine that the second advertised age is older than the first advertised age.

The program instructions may further cause the computer system to determine that a difference between the first and second advertised ages is greater than a threshold time value prior to the migration. The computer may add a reference to the migrated reclaimable block to the second list and it may remove a reference to the migrated reclaimable block from the first list after the migration. The reference to the migrated reclaimable block may be added to the second list among other references to other reclaimable blocks in order by age. The computer system may also determine that the first caching device has a storage utilization above a minimum threshold level and that the second caching device has a storage utilization below a maximum threshold level prior to the migration.

In yet another illustrative, non-limiting embodiment, a method may include, in a clustered memory cache having a plurality of caching devices, maintain lists of reclaimable blocks that reside in each caching device, where all reclaimable blocks have no read or write references, are clean, and have no corresponding replica blocks; and migrating a subset of the reclaimable blocks among two or more caching devices to effect a load balancing operation.

The method may also include maintaining a first list of reclaimable blocks that reside in a first caching device and a second list of reclaimable blocks that reside in a second caching device; determining that the second caching device is under-utilized with respect to the first caching device; migrating at least one reclaimable block from the first caching device to the second caching device; and updating the first and second lists of reclaimable blocks.

The method may further include, prior to migrating at least one reclaimable block from the first caching device to the second caching device: maintaining a first advertised age for the oldest reclaimable block of the first list, wherein the first advertised age indicates how long ago the oldest reclaimable block of the first list became reclaimable; maintaining a second advertised age for the oldest reclaimable block of the second list, wherein the second advertised age indicates how long ago the oldest reclaimable block of the second list became reclaimable; and determining that the second advertised age is older than the first advertised age.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
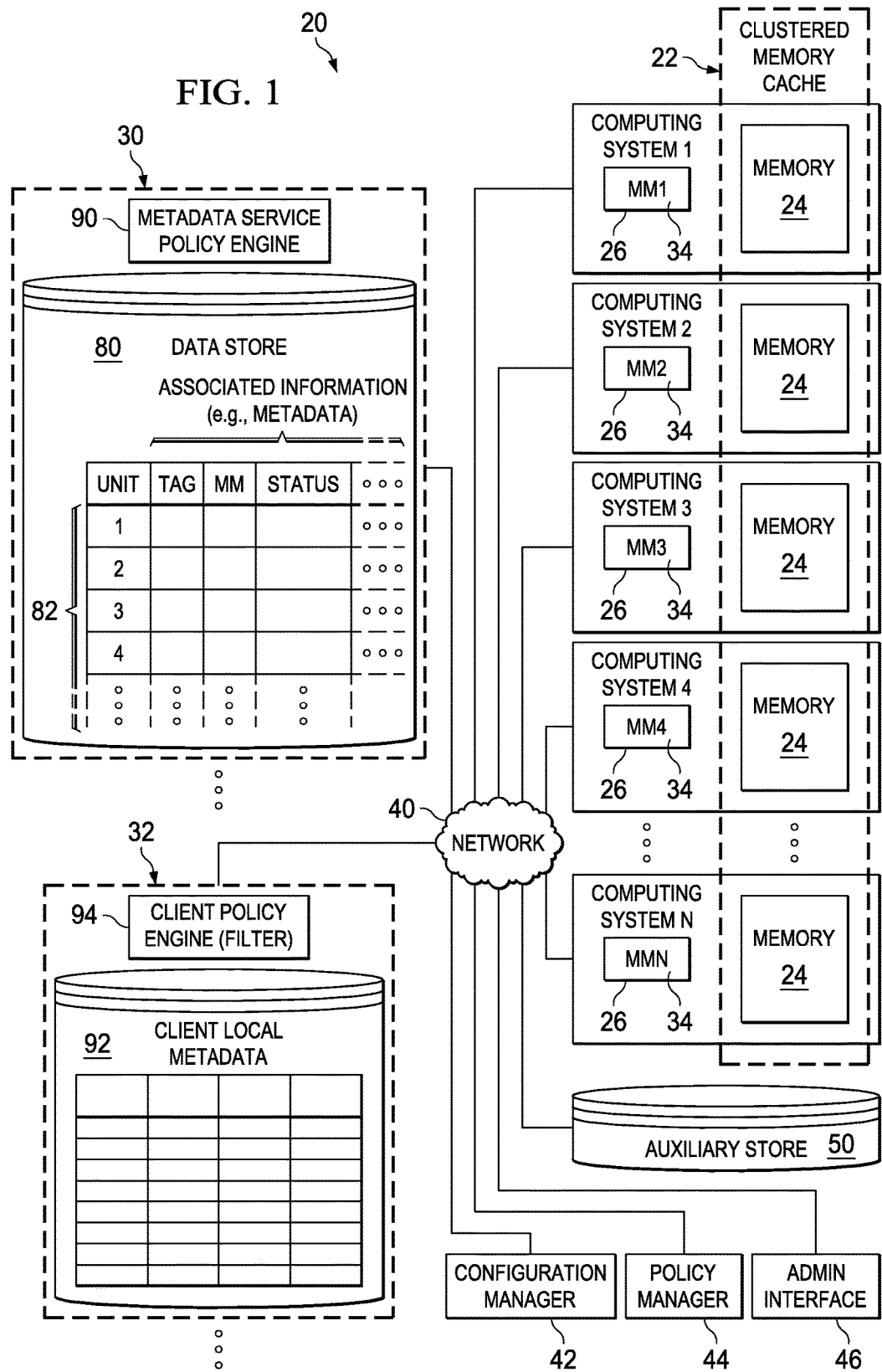
FIG. 1 is a block diagram of an example network with distributed shared memory according to some embodiments.

FIG. 1 depicts an example computer network 20 with distributed memory. The memory resource and supporting systems may be configured in a variety of different ways and for different applications. Caching is one example of a use of computer network 20. Accordingly, the distributed memory resource in the example of FIG. 1, and in other examples discussed herein, includes a clustered memory cache 22. Referring specifically to FIG. 1, clustered memory cache 22 may be aggregated from and comprised of physical memory locations 24 on a plurality of physically distinct computing systems 26 (individually designated as Computing System 1, Computing System 2, etc.) and associated local memory managers 34 (individually designated as MM1, MM2, etc.). In particular embodiments, physical memory 24 may include one or more solid state devices (SSDs) including, for example, one or more SSDs compliant with a standard such as the Peripheral Component Interconnect Express (PCIe) standard. Physical memory 24 may include persistent or non-volatile memory devices 24 including, for example, flash and magnetic disk. In particular embodiments, each type of physical memory 24 (e.g., RAM, flash, magnetic disk) on a computing system 26 may have its own local memory manager 34. Additionally, physical memory 24 may have hot plug capabilities, such that physical memory 24 may be inserted into, removed from, or swapped between computing systems 26 without the need for pausing the operation of computer network 20 or clustered cache 22. Computer network 20 also includes a metadata service 30, a plurality of clients 32 (only one of which is shown in the example embodiment of FIG. 1), and, as described above, a plurality of local memory managers 34 (individually designated as MM1, MM2, etc.). In particular embodiments, metadata service 30 may be located on one or more computing systems 26. Each of the local memory managers 34 is local to and associated with a different portion of clustered memory cache 22. The metadata service, clients and local memory managers are all operatively coupled with each other via network 40. In addition, one or more configuration managers 42 (only one is shown in the example of FIG. 1), a policy manager 44, and an admin interface 46 may also be provided as part of computer network 20 (and may, in particular embodiments, be operatively coupled to other elements via network 40), to provide various functions that will be described below. In particular embodiments, configuration manager 42 may be located on one or more computing systems 26. Computer network 20 includes an auxiliary store 50 which may also be coupled to other elements in computer network 20 via network 40. Auxiliary store 50 may include one or more storage devices or systems at various locations (local or remote), including but not limited to hard disks, file servers, disk arrays, storage area networks, and the like. Auxiliary store 50 may, in particular embodiments, include DAS backing devices (used by a particular computing system 26), SAN backing devices (shared among computing systems 26), or a combination of the two.

Clustered memory cache 22 provides a shared memory resource that can be accessed and used by the clients. Depending on the mode of operation, clients 32 can read from and write to the clustered memory cache and cause insertion and/or eviction of data items to/from the cache.

As used herein, "client" may broadly to refer to any hardware or software entity that makes use of the shared memory resource. For example, clients may include personal computers, workstations, servers and/or applications or other software running on such devices.

"Client" may also more specifically refer to a driver or other software entity that facilitates access to the shared memory resource. For example, as will be described in more detail, a driver can be loaded into memory of a networked computer, allowing applications and the operating system of that computer to recognize or make use of the clustered cache.

The distributed shared memory described herein may be operated in a variety of modes. Many of the examples discussed herein will refer to a mode where clustered memory cache 22 provides caching functionality for data used by clients 32. In particular, data items read from an auxiliary store 50 may be cached in clustered memory cache 22, and data items to be written to auxiliary store 50 may also be cached in clustered memory cache 22. Thus, even though a particular client may have ready access to the auxiliary store (e.g., access to a file system stored on a hard disk), it may be desirable to place requested data in the clustered memory cache, so as to provide faster access to the data.

Local Memory Managers

Regardless of the particular mode of operation, the clustered memory cache may span multiple physically distinct computing systems. For example, in FIG. 1, clustered memory cache 22 includes memory from N different computing systems 26 (Computing System 1, Computing System 2, etc., through Computing System N). The individual computing systems can be of varying configurations, for example ranging from relatively low-powered personal devices to workstations to high-performance servers. SMP or other multiprocessor architectures may be employed as well, in which one or more of the computing systems employ multiple processors or cores interconnected via a multiprocessor bus or other interconnect. As described in detail herein, physical memory 24 from these physically distinct systems 26 may be aggregated via network 40 and made available to clients 32 as a unified logical resource.

Referring particularly to local memory managers 34, each memory manager may be local to and associated with a different portion of clustered memory cache 22. The memory managers typically are independent of one another, and each is configured to allocate and manage individual units of physical memory in its associated portion of clustered memory cache 22.

The local memory managers can be configured to manage client references and access to cached data items. As an illustration, assume a particular client 32 needs access to a data item cached in the portion of clustered cache 22 that is managed by memory manager MM1. The client may query metadata service 30 to identify which local memory manager 34 (in this case, MM1) manages the desired cached data item, as described in further detail below. Once the client knows the memory location for the cached item is managed by MM1, the client contacts MM1 via network 40 to gain access to the cached item. If access is permitted, the memory manager MM1 grants access and maintains a record of the fact that the requesting client has a reference to the memory location. The record may indicate, for example, that the client has a read lock on a particular block of memory that is managed by memory manager MM1.

In some embodiments, clustered memory cache 22 may be implemented using Remote Direct Memory Access (RDMA). RDMA implementations that may be employed include, but are not limited to, the Virtual Interface Architecture, InfiniBand, RDMA over Converged Ethernet (RoCE), RDMA over TCP/IP, and iWARP. In such a setting, the local memory manager may be configured to provide RDMA keys to requesting clients or otherwise manage the respective access controls of the RDMA implementation.

For any given memory manager, the associated portion of the clustered cache will often include many different blocks or other units of memory. In particular, referring to FIG. 2, an exemplary memory manager 34 is depicted, including a cache store 60. In the depicted example, cache store 60 is schematically represented as a table, with a record (row entry) for each block or other unit of physical memory managed by the memory manager. In particular embodiments of clustered cache 22 having cache data replication functionality, one cache store 60 may be created in memory manager 34 for non-replica portions of clustered cache 22 managed by memory manger 34. Separate cache stores 60 may be created in memory manager 34 for each replica store managed by memory manger 34. The first column in the example is simply an index, tag or other identifier used to designate a particular block of memory.

Figure 2:
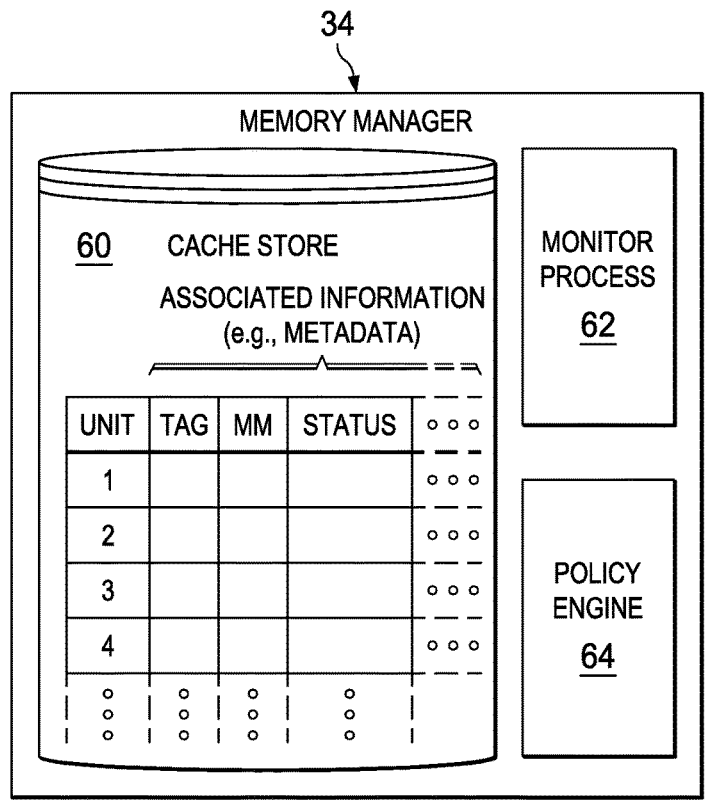
FIG. 2 is a block diagram of an example of a memory manager according to some embodiments.

The remaining column or columns may contain metadata or other information associated with the corresponding unit of memory and/or the data stored in that unit of memory. As depicted in FIG. 2, memory manager 34 may also include a monitor thread 62 to facilitate the acquisition and updating of the cache store information. The associated information may include, by way of example, information about read locks, write locks and/or other client references to the unit of memory; a filename/path hash or other mechanism for identifying the cached data item(s); status indicators; rates of eviction and insertion; temporal information such as time resident in the cache, time since last access, etc.; block size or other capacity information relating to the unit of memory; and/or other information concerning the memory unit, such as statistical information regarding usage of the memory unit or the items cached in the memory unit. These are but illustrative examples. Also, it should be understood that while cache store 60 is depicted schematically to include the information in a table, a variety of other data structures or mechanisms may be employed to maintain the information store.

Local memory managers 34 may also be configured to receive and respond to requests to insert particular data items into clustered memory cache 22. As will be explained in more detail below, these cache insertion requests can arise from and be initiated by actions of metadata service 30 and clients 32. In some cases, the local memory manager may deny the cache insertion request. One situation where an insertion request can be denied is if the request is directed to a block containing an item that cannot be immediately evicted, for example because there are active client references to the cached item.

Assuming, however, that the insertion request is grantable by the local memory manager, the local memory manager acknowledges and grants the request. The memory manager also coordinates the population of the respective memory block with the data item to be cached, and appropriately updates any associated information for the block in the cache store (e.g., cache store 60).

Similarly, each local memory manager 34 is configured to receive and respond to requests to evict items from its associated portion of clustered memory cache 22. As with insertion requests, the eviction requests can arise from actions of the metadata service 30 and one or more of clients 32, as will be explained in more detail below. Assuming the request is grantable, the memory manager acknowledges and grants the request, and flushes the memory block or takes other appropriate action to make the memory block available for caching of another item.

In various situations, prior to completing the eviction of a free block, the free block first becomes reclaimable. A client reference release signal, which is not an eviction signal but an indication that a client is no longer actively using the block, may be used to determine that the block is now reclaimable prior to it being evicted. Incidentally, any block may have read or write references by any number of clients. It is when all of these read and write references go away that the block becomes reclaimable.

In some example embodiments, it will be desirable to notify clients 32 when items are to be evicted from the clustered memory cache. Accordingly, the local memory managers may also be configured to maintain back references to clients accessing items in the cache. For example, assume a client requests access to an item in a portion of the cache managed by a memory manager, and that the memory manager has responded by granting a read lock to the client. Having maintained a back reference to the client (e.g., in cache store 60), the local memory manager can then notify the client in the event of a pending eviction and request that the client release the lock.

As discussed above, each local memory manager may be local to and associated with a different portion of the clustered memory cache. Although memory managers may be referred to herein as "local" memory managers, they need not be physically proximate to the physical memory. The local memory managers may be located elsewhere in some embodiments. In the example of FIG. 1, each of the distinct computing systems 26 has an individual memory manager responsible for the physical memory 24 contributed by the computing system 26 to the clustered cache. Alternatively, multiple local memory managers may be employed within a computing system.

In particular embodiments, clustered memory cache 22 may operate in a write-through mode; that is, write operations (initiated, for example, by client 32) are not completed until data that has been written to cache 22 is also flushed to a backing store such as auxiliary store 50. In other embodiments, clustered memory cache 22 may operate in a write-back mode; that is, write operations (initiated, for example, by client 32) are completed as soon as the data is written to cache 22, and write data is flushed to a backing store such as auxiliary store 50 at a later time. This later time may occur, for example, when a client 32 issues a flush on all cache blocks to which it has written.

In particular embodiments, clustered memory cache 22 may include cache data replication functionality, described in further detail below. In an embodiment including the cache data replication functionality, physical memory 24 may include data representing a portion of clustered memory cache 22 as well as one or more replica stores of data representing another portion or portions of clustered memory cache 22, with both the data and the replica stores managed by local memory manager 34. As an example, with reference to FIG. 1, computing system 1 includes local memory manager MM1. The physical memory 24 associated with MM1 may include both data representing a portion of clustered memory cache 22, as well as a replica store of data representing the portion of clustered memory cache 22 associated with local memory manager MM2. Additionally, in an embodiment with cache data replication functionality, each unit of physical memory 24 may include certain metadata including, for example, memory 24 identifier (e.g., manufacture ID, worldwide name, etc.); for each replica store hosted by memory 24, the identifier, state, and primary store; for each replica store replicating data in memory 24, the replica store identifier and host memory 24; and for each cache block in memory 24, whether the cache block is dirty/unflushed or clean (and if dirty, when the cache block became dirty), and if dirty/unflushed, the replica stores where this block is replicated.

Figure 3:
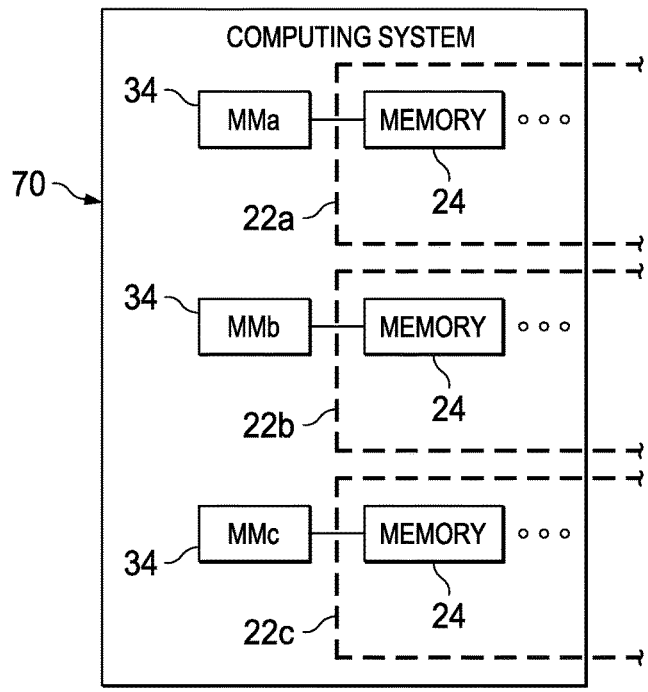
FIG. 3 is a block diagram of an example of another memory manager according to some embodiments.

FIG. 3 depicts an example of an alternate memory manager configuration. As in the previous example, computing system 70 is one of several physically distinct computing systems contributing physical memory 24 to a distributed memory resource. The example of FIG. 3 illustrates two configuration variations that may be applied to any of the examples discussed herein. First, the figure demonstrates a configuration in which the memory contributed from a single computing system is allocated in to multiple different segments. The individual segments, which may or may not be contiguous, are each managed by a different memory manager 34 (individually and respectively designated as MMa, MMb and MMc). As described below, the use of multiple memory managers and memory segments on a single computing system may be used to allow exportation of physical memory to multiple different aggregate memory resources. On the other hand, it may be desirable to employ multiple memory managers even where the memory is contributed to a single cache cluster or other shared memory resource.

Secondly, the figure demonstrates the use of multiple different clusters. Specifically, each local memory manager and memory segment pairing in the FIG. 3 example belongs to a different cache cluster (i.e., clusters 22a, 22b and 22c). Multiple cluster configurations may be employed for a variety of reasons, such as for security reasons, access control, and to designate specific clusters as being usable only by specific applications.

Local memory managers 34 may also be configured to report out information associated with the respective portions of clustered memory cache 22. As discussed above with reference to FIG. 2, each memory manager may include a cache store 60 with information about the memory managers memory locations. This information may be provided from time to time to metadata service 30, configuration manager 42, and/or other components of the systems described herein.

In particular embodiments, local memory manager may examine all possible local memory 24 devices upon startup or upon a plug-and-play event (indicating that memory 24 has been added to the associated computing system 26) to determine which memory 24 belongs to clustered cache 22. This may, in particular embodiments, be determined by examining the memory identifier in the metadata of memory 24. If it is determined that memory 24 belongs to clustered cache 22, local memory manager 34 may update entries in its cache store 60 and communicate data regarding memory 24 to metadata service 30 or configuration manager 42 (including, for example, the journal in configuration manager 42). The determination whether memory 24 belongs to clustered cache 22 may, in some embodiments, be determined by examining an entry in the journal of configuration manager 42. In particular embodiments, local memory manager 34 may not allow access to the newly-added memory 24 until the memory 24 has been approved by the configuration manager 42 (e.g., approved as not being obsolete after an examination of an entry in the journal of the configuration manager).

Metadata Service Data Store

For example, as will be described in more detail below, metadata service 30 can provide a centralized, or relatively centralized, location for maintaining status information about the clustered cache. In particular, in FIG. 1, memory managers MM1, MM2, etc. through MMN may be considered to all be within a domain that is assigned to metadata service 30. Metadata service 30 can monitor the domain, for example by maintaining information similar to that described with reference to cache store 60, but for all of the memory managers in the domain.

More particularly, metadata service 30 may include a metadata service data store 80 for maintaining information associated with the memory locations in its domain that form the clustered cache. In one class of examples, and as shown in FIG. 1, metadata service data store 80 may include multiple records 82. Specifically, a record 82 is provided for each of the physical memory units 24 of clustered memory cache 22. For example, assume clustered memory cache 22 includes 64 million 8-kilobyte memory blocks (512 gigabytes of addressable cache memory) spread across computing systems 1 through N and local memory managers MM1 through MMN. In this example, metadata service data store 80 could be configured with 64 million records (rows), with each pertaining to one of the cache memory blocks in the cluster. In an alternate example, each record could apply to a grouping of memory locations. Numerous other arrangements are possible.

Various additional information may be associated with the records of metadata service data store 80. In particular, the metadata service may store a tag for each of the memory locations of the cache, as shown in the figure. In one example, the tag allows a requesting entity, such as one of clients 32, to readily determine whether a particular data item is stored in the cache. Specifically, the tag column entries may each be a hash of the path/filename for the data item resident in the associated memory block. To determine whether a requested data item (e.g., a file) is present in the cache, the path/filename of the requested item may be hashed using the same hash routine and the resulting hash compared to the tag column entries of the metadata service data store 80. The path and filename hash described above is provided by way of example; hash methodologies may be employed on other data, and/or other identification schemes may be employed.

Metadata service data store 80 may also indicate an associated local memory manager for each of its records, as shown at the exemplary column designated "MM." For example, data store 80 could indicate that a first memory block or range of memory blocks was managed by memory manager MM1, while a second bock or range of blocks was managed by local memory manager MM2. With such a designation, in the event that a query for a particular item reveals the item is present in the cache (e.g., via a match of the path/filename hash described above), then the response to that query can also indicate which local memory manager 34 should be dealt with to read or otherwise access the cached item.

In the example of FIG. 1, data store 80 also includes a status indication for each of the cache blocks. In one example, each of the cache blocks is indicated as having one of the following statuses: (1) empty, and therefore available to be populated; (2) insertion pending, indicating that the memory block is in the process of being populated with a newly-inserted cached item; (3) active, indicating that the memory block presently contains an active cached data item; or (4) deletion pending, indicating that the data item in the cache block is being deleted. It will be appreciated that these are illustrative examples, and other status information and flags may be employed. The specific exemplary status indications referred to above will be described in further detail below.

The tag, memory manager and status entries described above with reference to the cache blocks in data store 80 are non-limiting examples. As described in more detail below, metadata service 30 and its policy engine 90 typically play a role in implementing various policies relating to the configuration and usage of clustered memory cache 22. Application of various policies can be dependent upon rates of eviction and insertion for a cache block or data item; temporal information such as the time a data item has been cached in a particular block, time since last access, etc.; and/or other information concerning the cache block, such as statistical information regarding usage of the cache block or the data items cached therein.

It will thus be appreciated that the information maintained in metadata service data store 80 may overlap to some extent with the information from the various cache stores 60 (FIG. 2) of the local memory managers. Indeed, as previously indicated, the described system can be configured so that the memory managers provide periodic updates to maintain the information in the metadata service data store 80.

Also, the metadata service may be distributed to some extent across the network infrastructure. For example, multiple mirrored copies of the metadata service may be employed, with each being assigned to a subset of local memory managers. Memory manager assignments could be dynamically reconfigured to achieve load balancing and in the event of failure or other changes in operating conditions of the environment.

Operational Examples: Cache Hit, Cache Miss

Various examples will now be described illustrating how clients 32 interact with metadata service 30 and local memory managers 34 to access clustered memory cache 22. The basic context of these examples is as follows: a particular client 32 (FIG. 1) is running on an applications server executing a data-intensive financial analysis and modeling program. To run a particular analysis, the program may need to access various large data files residing on auxiliary store 50.

In a first example, the financial analysis program makes an attempt to access a data file that has already been written into clustered memory cache 22. This may have occurred, for example, as a result of another user causing the file to be loaded into the cache. In this example, client 32 acts as a driver that provides the analysis program with access to the clustered memory cache 22. Other example embodiments include client 32 operating in user mode, for example as an API for interacting with the clustered resource.

In response to the client request for the data file, metadata service 30 determines that the requested file is in fact present in the cache. This determination can be performed, for example, using the previously-described filename/path hash method. Metadata service 30 then responds to the request by providing client with certain metadata that will enable the client to look to the appropriate portion of the clustered memory cache (i.e., the portion containing the requested file).

In particular, metadata service 30 responds to the request by identifying the particular local memory manager 34 which is associated with the portion of the cache containing the requested file. This identification may include the network address of the local memory manager, a logical block address or a cache block number, or another identifier allowing derivation of the address. Once the client has this information, the client proceeds to negotiate with the local memory manager to access and read the requested file from the relevant block or blocks managed by the memory manager. This negotiation may include granting of a read lock or other reference from the local memory manager to the client, and/or provision of RDMA keys as described above.

When caching small files, an entire file may fit in a single cache block. When caching larger files or whole block devices, each file may require many cache blocks. As such, as part of a lookup process, a client may determine which cache block sized region of the file/LUN it will include in the query, which is part of the hash for the cache block.

As shown in FIG. 1, client 32 may include a local store 92 of metadata. In the above example, this local store may be used by the client to record the association between the requested data file and the corresponding local memory manager and respective portion of the clustered cache. Thus, by consulting local store 92, subsequent cache accesses to the cached file can bypass the step of querying metadata service 30. Indeed, clients 32 may be implemented to first consult local store 92 before querying metadata service 30, thereby allowing clients to more directly and efficiently access cached items. Metadata service 30 may thus function in one respect as a directory for the clustered memory cache 22. Clients having up-to-date knowledge of specific entries in the directory can bypass the directory and go directly to the relevant local memory manager.

In particular embodiments, local store 92 may include metadata such as a list of client write or read references to portions of clustered cache 22. As an example, client 32 may keep track of which cache blocks it holds write references to (as well as which local memory manager 34 manages these cache blocks) in local store 92. By keeping track of these write references, client 32 may be able to communicate with the corresponding local memory managers 34 and, upon request by a local memory manger 34, release certain of its write references to allow the local memory manager 34 to make room in its corresponding memory 24 for new data to be cached. Local store 92 may also contain a queue of which cache blocks are most- or least-recently used by client 32. Thus, if a particular cache block is the least recently used cache block by client 32, then it will be at the front of the least-recently-used (LRU) queue in local store 92 and may be the first write reference that client 32 releases, either voluntarily or when asked by a local memory manager 34. If there is a pending input/output request on a particular cache block, then the reference to that cache block may move to the back of the least-recently-used (LRU) queue in local store 92. In particular embodiments, there may be a limit on the number of cache block references (write, read, or some combination of both) that a client 32 is allowed to have in using clustered memory cache 22. This limit may be tracked, for example, by metadata service 30 (e.g., the policy engine 90), by one or more local memory mangers 34 (described below), or may be tracked and enforced at client 32 itself.

Another example will now be considered, in which the file requested by the analysis program is not present in clustered memory cache 22. As before, the analysis program and/or client 32 cause the file request to issue, and the request is eventually received at metadata service 30. Prior to messaging of the request to metadata service 30, however, the local client store 92 of metadata is consulted. In this case, because the requested file is not present in the cache, no valid metadata will be present in the local store. The request is thus forward to metadata service 30.

In response to the request, metadata service 30 cannot respond with a memory manager identification, as in the previous example, because the requested file is not present in the clustered memory cache. Accordingly, the hash matching operation, if applied to metadata service data store 80, will not yield a match.

The metadata service can be configured to implement system policies in response to this type of cache miss situation. Specifically, policies may be implemented governing whether the requested item will be inserted into the clustered memory cache, and/or at what location in the cache the item will be written. Assuming clustered cache 22 is populated with the requested item, the metadata service data store 80 will be updated with metadata including the designation of the responsible memory manager 34. This metadata can then be supplied in response to the original request and any subsequent requests for the item, so that the cached version can be accessed through client interactions with the appropriate memory manager.

Policies

The systems and methods described herein may be configured with various policies pertaining to the shared memory resource. Policies may control configuration and usage of the clustered memory cache; client access to the cache; insertion and eviction of items to and from the cache; caching of items in particular locations; movement of cached items from one location to another within the cache; etc. Policies may also govern start/stop events, such as how to handle failure or termination of one of the computing systems contributing memory locations to the cluster. These are non-limiting examples—a wide variety of possibilities exist.

In the example of FIG. 1, configuration manager 42, admin interface 46 and policy manager 44 perform various functions in connection with the policies. In particular, admin interface 46 can provide a command-line, graphical or other interface that can be used by a system administrator to define policies and control how they are applied. Configuration manager 42 typically is adapted to coordinate startup events, such as the login or registration of entities as they come on-line. In many settings, startup procedures will also include distribution of policies.

For example, in FIG. 1, initialization of clients 32 is handled by configuration manager 42. Specifically, when coming on-line, each client 32 initializes and registers with configuration manager 42. Configuration manager 42 provides the initializing client with addresses of the appropriate metadata service 30. Configuration manager 42 may also retrieve relevant policies from policy manager 44 and distribute them to the client, which stores them locally for implementation via client policy engine 94 (FIG. 1).

Configuration manager 42 typically also coordinates registration and policy distributions for metadata service 30 and local memory managers 34. The distributed policies may be stored locally and implemented via metadata service policy engine 90 (FIG. 1) and memory manager policy engines 64 (FIG. 2), respectively. From time to time during operation, the size and underlying makeup of the clustered memory resource may change as local memory managers launch and terminate, either intentionally or as a result of a failure or other unintentional system change. These startups and terminations may be handled by the configuration manager, to provide for dynamic changes in the shared memory resource. For example, during periods where heavier usage volume is detected (e.g., an escalation in the number of cache insertion requests), the configuration manager may coordinate with various distributed devices and their associated memory managers to dynamically scale up the resource. On the other hand, performance lags or other circumstances may dictate a dynamic adjustment where one or more memory managers are taken off-line. As described in more detail below, the present system may be configured to permit migration of cache data from one location to another in the shared resource. The startups and terminations described above provide examples of situations where such data migration may be desirable.

In particular embodiments, configuration manager 42 may include a journal (or any suitable data structure) containing state information about clustered cache 22, stored locally in persistent or non-volatile memory. Because the journal is maintained in persistent memory in configuration manager 42, even if the configuration manager fails (or, in the case of multiple configuration managers, if any or all of the configuration managers 42 of network 20 fail), cache state information may still be maintained. In particular embodiments, the journal may be mirrored elsewhere in network 20 or in clustered memory cache 22. Even in the case of a complete failure of all copies of the journal, the journal may be reconstructed from metadata information stored in memory 24 (described above); if memory 24 is non-volatile memory, then the journal may be reconstructed even after a complete shutdown of cache 22.

The journal of the configuration manager 42 may include the following information about each memory unit 24 of the clustered cache 22: one or more memory 24 identifiers (e.g., manufacture ID, worldwide name, cache-specific name, etc.), memory 24 type (e.g., RAM, flash, persistent local disk), memory 24 size, memory 24 state (e.g., inactive, active, failed, failed and recovered, removed), an identifier of the local memory manager 34 that manages memory 24 (e.g., the local memory manager that most recently registered memory 24 with the journal), associated replica store identifiers (e.g., physical IDs of memory 24 containing any associated replica stores, cache-specific IDs of memory 24 containing replica stores), an identifier of the local memory manager(s) 34 of the associated replica store(s), associated replica store states, and replica stores that are currently being re-hosted on associated replica stores. Additionally, the journal may include information about the one or more metadata services 30 that are part of the clustered cache 22 including, for example, the identifiers of any metadata servers that have been expelled from cache 22. The journal may also include partition map generation numbers, local memory manager 34 membership generation numbers, and, for each auxiliary store 50 (or each device in auxiliary store 50), a device pathname and a device state.

The configuration manager 42 may communicate with metadata service 30 (including, for example, data store 80), clients 32, local memory managers 34 (including, e.g., cache store 60), or any other part of network 20 to obtain information to update entries in its journal. Additionally, entries in the journal may be examined by configuration manager 42 to communicate information to metadata service 30 (including, for example, data store 80), clients 32, local memory managers 34 (including, e.g., cache store 60), or any other part of network 20.

As an example, if a local memory manager 34 communicates to configuration manager 42 that a new physical memory 24 has been detected (e.g., upon startup or upon a plug-and-play event) and also communicates the memory identifier in the metadata of new memory 24, the configuration manager 42 may examine its journal to determine whether the memory identifier corresponds to an existing memory unit in cache 22 or whether a new entry must be created for the new memory 24. Additionally, the configuration manager may also determine, if the identifier corresponds to an existing memory unit in cache 22, whether the existing memory unit is valid for use (e.g., based on the memory state—whether failed, recovered, removed, etc.). Configuration manager 42 may then communicate to local memory manager whether the "new" memory 24 may be used by local memory manager 34. If so, local memory manager 34 may update entries in its cache store 60 and communicate data regarding memory 24 to metadata service 30 or configuration manager 42.

As another example, a local memory manager 34 may report the failure of a unit of memory 24. Configuration manager 42 may update its journal to record the new state of the memory 24, and may examine its journal to determine whether a replica store exist for memory 24, and if so, which local memory manager manages this replica store. Configuration manager 42 may communicate with the local memory manger managing the replica store and tell it to "absorb" the replica as a normal (non-replica) portion of the cache 22, and subsequently the journal may be updated. Configuration manager 42 may also communicate with yet another local memory manager to create a new replica store for the absorbed replicas (e.g., in the same physical memory 24 containing replica stores for the local memory manager who has "absorbed" the replica), and subsequently update the journal.

As indicated above, policy manager 44 may be configured to provide a master/central store for the system policy definitions, some or all of which may be derived from inputs received via admin interface 46. Policy manager 44 may also validate or verify aggregate policies to ensure that they are valid and to check for and resolve policy conflicts. The policy manager 44 typically also plays a role in gathering statistics relating to policy implementations. For example, the policy manager may track the number of policy hits (the number of times particular policies are triggered), and/or the frequency of hits, in order to monitor the policy regime, provide feedback to the admin interface, and make appropriate adjustments. For example, removal of unused policies may reduce the processing overhead used to run the policy regime.

As should be appreciated from the foregoing, although the policies may be defined and managed centrally, they may also be distributed and implemented at various locations in the system. Furthermore, the policy ruleset in force at any given location in the system may vary based on the nature of that location. For example, relative to any one of memory managers 34 or clients 32, metadata service 30 has a more system-wide global view of clustered memory cache 22. Accordingly, policy rulesets affecting multiple clients or memory managers can be distributed to and implemented at metadata service 30.

Client Filter

Referring to clients 32, and more particularly to the client policy engines 94 incorporated into each client, various exemplary client-level policy implementations will be described. Many example policies implemented at the clients operate as filters to selectively control which client behaviors are permitted to impact the shared memory resource. More specifically, the client policy engine may be configured to control whether requests for data items (e.g., an application attempting to read a particular file from auxiliary store 50) are passed on to metadata service 30, thereby potentially triggering an attempted cache insertion or other action affecting the clustered cache.

The selective blocking of client interactions with metadata service 30 operates effectively as a determination of whether a file or other data item is cacheable. This determination and the corresponding policy may be based on a wide variety of factors and criteria. Non-limiting examples include:

(1) Size—i.e., items are determined as being cacheable by comparing the item size to a reference threshold. For example, files larger than N bytes are cacheable.

(2) Location—i.e., items are determined as being cacheable depending on the location of the item. For example, all files in a specified path or storage device are cacheable.

(3) Whitelist/Blacklist—a list of files or other items may be specifically designated as being cacheable or non-cacheable.

(4) Permission level or other flag/attribute—for example, only read-only files are cacheable.

(5) Application ID—i.e., the cacheable determination is made with respect to the identity of the application requesting the item. For example, specified applications may be denied or granted access to the cache.

(6) User ID—e.g., the client policy engine may be configured to make the cacheable determination based on the identity of the user responsible for the request.

(7) Time of Day.

In addition, these examples may be combined (e.g., via logical operators). Also, as indicated above, the list is illustrative only, and the cacheability determination may be made based on parameters other than the cited examples.

Cache Insertion and Cache Eviction

Cache insertion policies may determine whether or not a file or other data item may be inserted into clustered memory cache 22. For example, cache insertion policies may be applied by metadata service 30 and its policy engine 90, though application of a given policy may be based upon requests received from one or more clients 32, and/or upon metadata updates and other messaging received from the local memory managers 34 and maintained in metadata service data store 80 (FIG. 1).

In some examples, administrators or other users are able to set priorities for particular items, such as assigning relatively higher or lower priorities to particular files/paths. In addition, the insertion logic may also run as a service in conjunction with metadata service 30 to determine priorities at run time based on access patterns (e.g., file access patterns compiled from observation of client file requests).

Further non-limiting examples of cache insertion policies include:

(1) Determining at metadata service 30 whether to insert a file into clustered memory cache 22 based on the number and/or frequency of requests received for the file. The metadata service can be configured to initiate an insertion when a threshold is exceeded.

(2) Determining at metadata service 30 whether to insert a file into clustered memory cache 22 based on available space in the cache. This determination typically will involve balancing of the size of the file with the free space in the cache and the additional space obtainable through cache evictions. Assessment of free and evictable space may be based on information in metadata service data store 80.

(3) Determining at metadata service 30 whether to insert a file into clustered memory cache 22 based on relative priority of the file.

Metadata service 30 may also implement eviction policies for the clustered memory cache 22. Eviction policies determine which data items to evict from the cache as the cache reaches capacity. Eviction policies may be user-configured (e.g., by an administrator using admin interface 46) based on the requirements of a given setting, and may be applied based on metadata and other information stored at metadata service 30 and/or memory managers 34.

In particular, metadata service 30 may reference its data store 80 and predicate evictions based on which memory location within its domain has been least recently used (LRU) or least frequently used (LFU). Other possibilities include evicting the oldest record, or basing evictions on age and frequency based thresholds. These are provided as examples, and evictions may be based upon a wide variety of criteria in addition to or instead of these methods.

As previously mentioned, although metadata service 30 has a global view of the cache and is therefore well-positioned to make insertion/eviction determinations, the actual evictions and insertions are carried out by the memory managers 34 in some embodiments. Indeed, the insertion/eviction determinations made by metadata service 30 are often presented to the memory managers as requests that the memory managers can grant or deny. In other cases, the memory manager may grant the request, but only after performing other operations, such as forcing a client to release a block reference prior to eviction of the block.

In other cases, metadata service 30 may assign higher priority to insertion/eviction requests, essentially requiring that the requests be granted. For example, the overall policy configuration of the system may assign super-priority to certain files. Accordingly, when one of clients 32 requests a super-priority file, if necessary the metadata service 30 will command one or more memory managers 34 to evict other data items and perform the insertion.

In many embodiments, however, the local memory managers have authority over the cache memory locations that they manage, and are able in certain circumstances to decline requests from metadata service 30. One reason for this is that the memory managers may have more accurate and/or current information about their associated portion of the cache. Information at the memory managers may be more granular, or the memory managers may maintain certain information that is not stored at or reported to metadata service 30. On the other hand, there may be delays between changes occurring in the cache and the reporting of those changes from the respective memory manager to metadata service 30. For example, metadata service 30 might show that a particular block is evictable, when in fact its memory manager had granted multiple read locks since the last update to the metadata service. Such information delays could result from conscious decisions regarding operation of the clustered cache system. For example, an administrator might want to limit the reporting schedule so as to control the amount of network traffic associated with managing the shared memory resource.

The above-described distribution of information, functionality and complexity can provide a number of advantages. The highly-distributed and non-blocking nature of many of the examples discussed herein may allow them to be readily scaled in large datacenter environments. The distributed locking and insertion/eviction authority carried out by the memory managers may allow for many concurrent operations and reduce the chance of any one thread blocking the shared resource. Also, the complicated tasks of actually accessing the cache blocks are distributed across the cluster. This distribution is balanced, however, by the relatively centralized metadata service 30, and the global information and management functionality it provides.

Furthermore, it should be appreciated that various different persistence modes may be employed in connection with the clustered memory resource described herein. In many of the examples discussed herein, a read-only caching mode is described, where the clustered resource functions to store redundant copies of data items from an underlying auxiliary store. This may enhance performance because the cluster provides a shareable resource that is typically faster than the auxiliary store where the data originates. However, from a persistence standpoint, the data in the cluster may be flushed at any time without concern for data loss because the cluster does not serve as the primary data store. Alternatively, the cluster may be operated as a primary store, with clients being permitted to write to locations in the cluster in addition to performing read operations. In this persistence mode, the cluster data may be periodically written to a hard disk or other back-end storage device.

A further example of how the clustered memory resource may be used is as a secondary paging mechanism. Page swapping techniques employing hard disks are well known. The systems and methods described herein may be used to provide an alternate paging mechanism, where pages are swapped out the high performance memory cluster.

Locality within Clustered Cache

The exemplary policy regimes described herein may also operate to control the location in clustered memory cache 22 where various caching operations are performed. In one class of examples, metadata service 30 selects a particular memory manager 34 or memory managers to handle insertion of a file or other item into the respective portion of the cache. This selection may be based on various criteria, and may also include spreading or striping an item across multiple portions of the cluster to provide increased security or protection against failures.

In another class of examples, the metadata service coordinates migration of cached items within clustered memory cache 22, for example from one location to another in the cache. This migration may be necessary or desirable to achieve load balancing or other performance benefits.

Figure 4:
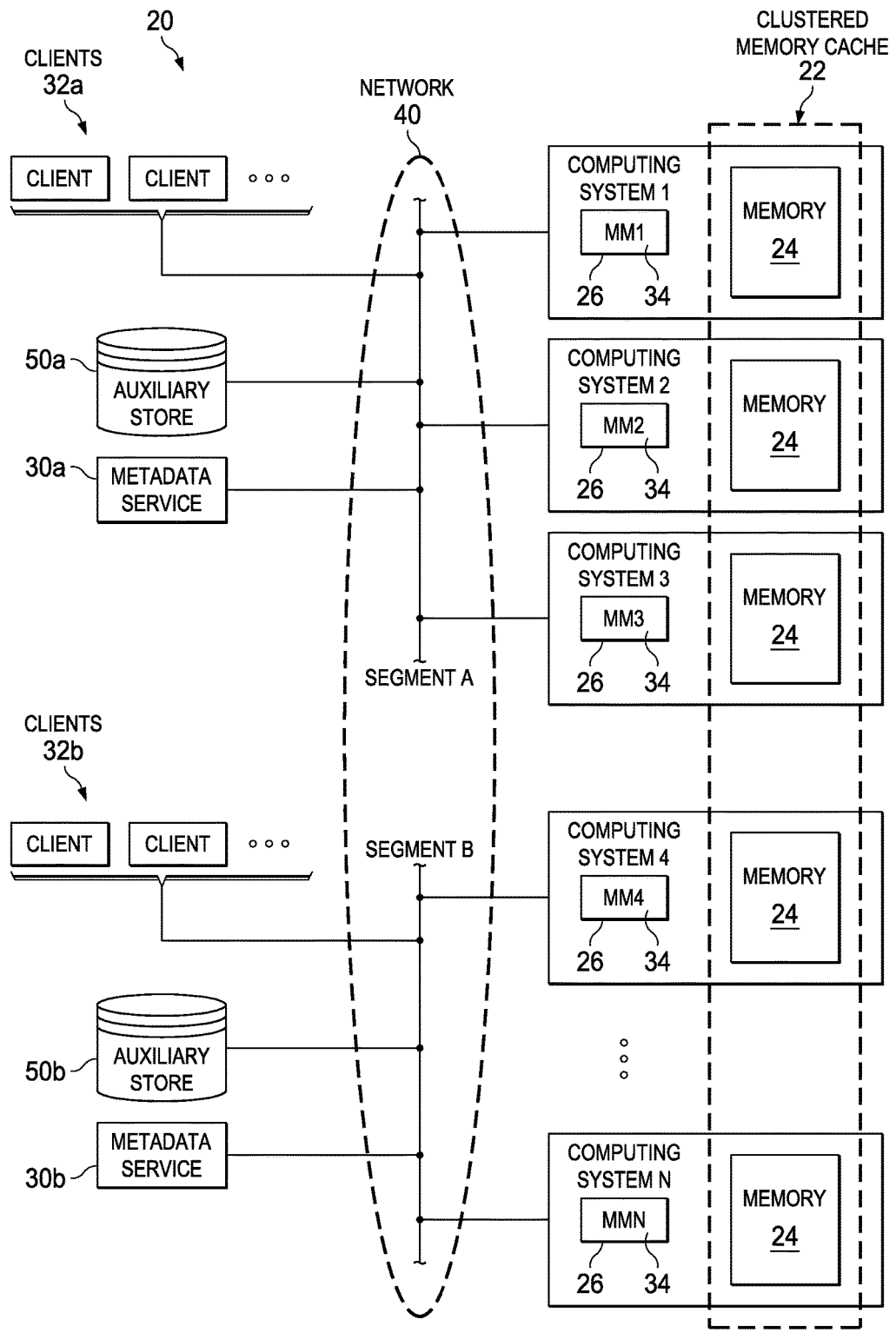
FIG. 4 is a block diagram of an example of a distributed shared memory environment with a clustered memory resource distributed across multiple network segments according to some embodiments.

A variety of exemplary locality policies will now be described, at times with reference to FIG. 1 and FIG. 4. FIG. 4 depicts another example of a shared-memory computer network 20. The depicted example is similar in many respects to the example of FIG. 1, except that network 40 includes multiple segments. Two segments are depicted: Segment A and Segment B. The segments may be separated by a router, switch, etc. As before, clustered memory cache 22 is comprised of memory 24 from multiple physically distinct computing systems 26, however some portions of the cache are local to network Segment A, while others are local to network Segment B. Clients 32a, auxiliary store 50a and metadata service 30a are on Segment A, while Clients 32b, auxiliary store 50b and metadata service 30b are on Segment A In a first example, cache insertion locality is determined based on relative usage of memory locations 24. Usage information may be gathered over time and maintained by memory managers 34 and the metadata services, and maintained in their respective stores. Usage may be based on or derived from eviction rates, insertion rates, access frequency, numbers of locks/references granted for particular blocks, etc. Accordingly, when determining where to insert an item in clustered memory cache 22, the metadata service may select a less utilized or underutilized portion of the cache to achieve load balancing.

The metadata service may also coordinate migration of cache items from one location to another based on relative usage information. For example, if information in metadata service data store 80 (FIG. 1) indicates unacceptable or burdensome over-usage at memory managers MM2 and MM3, metadata service 30 can coordinate relocation of some of the data items to other memory managers (e.g., memory managers MM1 or MM4).

In another example, locality policies are implemented based on location of the requesting client. Assume for example, with reference to FIG. 4, that a cache insertion request is triggered based on an application associated with one of clients 32a (Segment A). The policy configuration could be implemented such that this would result in an attempted insertion at one of the Segment A memory managers (MM1, MM2 or MM3) instead of the Segment B managers. In yet another example, if a client 32a has an application that is located on a computing system 26 on Segment A, a policy configuration could be implemented such that this would result in an attempted insertion at the Segment A memory manager (MM1, MM2, or MM3) that is co-located on the same computing system 26 as the application.

In particular embodiments, a locality policy may be implemented based on the location of the client most likely to access the data. As an example, in the case of virtualization environments, it is often the case that a single virtual machine (a type of client application) accesses a cache block without overlapping or sharing this cache block with another client 32 or client application. Thus, as described above, one locality policy may be to locate the requested data from auxiliary store 50 in a cache block in the memory 24 of the same computing system 26 hosting the virtual machine application. Because it is unlikely (in the case of a virtual machine application) that a request for that same data would come from another client application, if a different memory manager 34 (or computing system 26) seeks to access this same data due to a client request, it is likely that the virtual machine application has actually migrated to a portion of network 20 associated with this different memory manager 34 (or computing system 26). Thus, in one implementation of this locality policy (whether for virtual machine applications or general client applications), a timer is started when a second memory manager (or computing system) seeks to access (at the request of a client application) the same data that is stored in a cache block co-located with a first client application and managed by a first memory manager that created (or allocated or wrote) the cache block. Metadata associated with the cache block (located, e.g., in cache store 60 or in memory 24 itself) may contain an identifier for the client or client application who initially requested the cache block. If a certain amount of time has passed (e.g., several seconds or several milliseconds) since the first memory manager or client application has accessed the cache block, it may be determined that the first client application has actually migrated to a second portion of network 20 associated with the second memory manager. The cache block may then be migrated to the second memory managers associated memory in order to serve the client application in its new location. In particular embodiments, once a cache block has been migrated, a second timer is started, such that the cache block cannot be migrated (for locality policy reasons) again until the second timer reaches a predetermined value (e.g., one hour). The pattern of access to a particular cache block by client applications (or memory managers) may, in particular embodiments, be stored and tracked (e.g. in cache stores 60) before it is determined whether a migration of a client application has occurred and whether the cache block should also be migrated. Additionally, a variety of statistics regarding accesses to individual cache blocks or groups of associated or correlated cache blocks may also be tracked by memory managers 34 and stored in cache store 60. The locality policy may be turned on or off depending on a variety of factors, and it may be applied globally within memory cache 22 or locally within certain segments of network 40. For example, the policy may be turned on or off depending on whether a particular logical volume contains support for virtualized data. Additionally, certain clients may have more or less priority in terms of the locality policy than other clients. For example, even if a particular client application accesses a cache block frequently, if it is a low priority client application, it will not trigger a migration event for the cache block. In yet another embodiment, data relating to the performance of access times (collected, e.g., from clients 32) may be used to determine whether network 20 has slow or fast links, and to use this information in determining whether and where to migrate cache blocks within the network. Metadata relating to this locality policy (stored, e.g., in cache store 60 or in memory 24) may include bits indicating the type of placement policy, a time stamp for the last access to the cache block, and the network address (e.g., IP address) for the last accessor. Any or all of this data may be communicated to or stored in metadata service 30 (including data store 80) or configuration manager 42 (including a journal), and any locality policy may be controlled by metadata service 30, configuration manager 42, policy manager 44, or any other suitable component of computer network 20.

In another example, the relative location of the underlying data item is factored into the locality policy. Referring to FIG. 4, policies may be configured to specify that files located on auxiliary store 50*b* (on Segment B) are to be cached with the Segment B memory managers 34. This may be the case even where the requesting client is located on Segment A. Where policy implementations compete, as in this example, other aspects of the policy configuration can resolve the conflict, for example through prioritization of various components of the overall policy regime.

From the above, it should be understood that locality may be determined by tracking usage patterns across the cluster and migrating memory blocks to nodes optimized to reduce the total number of network hops involved in current and anticipated uses of the cluster. In many cases, such optimization will significantly reduce latency and potential for network congestion. The usage data may be aggregated from the clients by the configuration manager and propagated to the metadata service(s) as a form of policy that prioritizes various cache blocks.

The policy implementation may also be employed to detect thrashing of data items. For example, upon detecting high rates of insertion and eviction for a particular data item, the system may adjust to relax eviction criteria or otherwise reduce the thrashing condition.

A further locality example includes embodiments in which a block or data item is replicated at numerous locations within the clustered memory resource, described further below. In certain settings, such replication will improve fault tolerance, performance, and may provide other advantages. For example, in a caching system, multiple copies of a given cache block could be sited at multiple different locations within the clustered cache. A metadata service query would then result in identification of one of the valid locations. In some embodiments, the second valid location may be maintained as a replica purely for fault tolerance purposes and may not be directly accessible to clients.

Shared Memory Method

Figure 5:
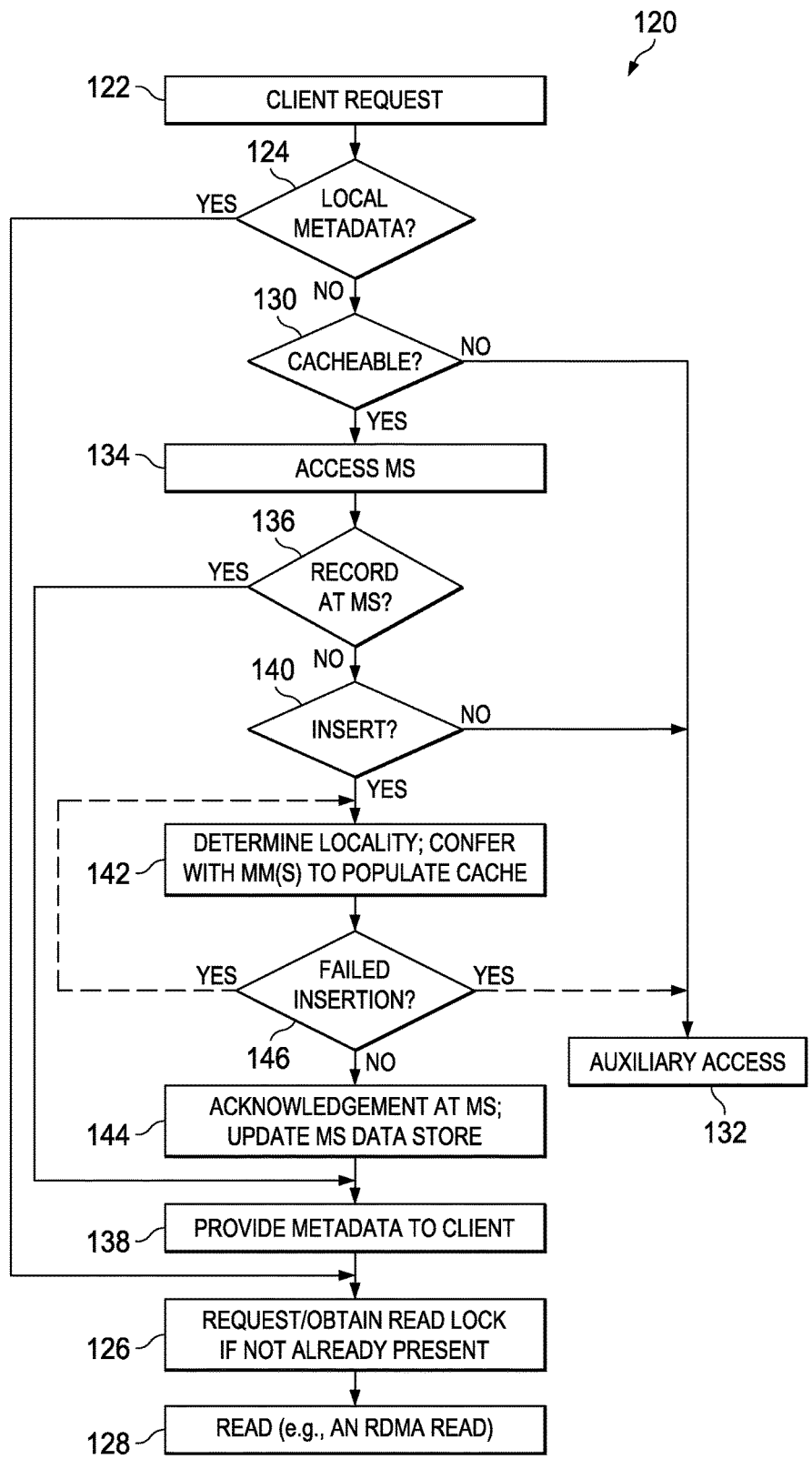
FIG. 5 is a flowchart of an example of a method for using a distributed shared memory resource according to some embodiments.

Referring now to FIG. 5, an example shared memory method 120 will be described, in the context of client entities accessing a clustered memory cache. As before, the clustered memory cache may be aggregated from and comprised of physical memory on multiple physically distinct computing systems. The context further includes attempts by the clients to access data items that are stored in an auxiliary store, but which may also be inserted into the clustered memory cache.

The method may generally include running a local memory manager on each of a plurality of physically distinct computing systems operatively coupled with each other via network infrastructure. One or more metadata services are instantiated, and operatively coupled with the network infrastructure. Communications are conducted between the metadata service(s) and the local memory managers to provide the metadata service with metadata (e.g., file/path hashes, usage information/statistics, status, etc.) associated with the physical memory locations. The metadata service may then be operated to provide a directory service and otherwise coordinate the memory managers, such that the physical memory locations are collectively usable by clients as an undifferentiated memory resource.

Referring specifically to the figure, at 122, method 120 may also include issuing of a client request. As in the examples described above, the request may originate or issue from an operating system component, application, driver, library or other client entity, and may be directed toward a file or other data item residing on a file server, disk array or other auxiliary store.

As shown at 124, method 120 may also include checking a local store to determine whether metadata is already available for the requested item. The existence of local metadata indicates that the requested item is currently present and active in the clustered memory cache, or at least that it was at some time in the past. If local metadata is available, a read lock is obtained if necessary (126) and the item is read from its location in clustered memory cache (128).

In the context of FIG. 1, these steps could correspond to an application request, via client 32, for a particular file located on auxiliary store 50. In response to the request, client 32 would retrieve valid metadata for the requested file from local metadata store 92. The retrieved metadata would indicate the particular memory manager 34 for the data item, and/or would otherwise indicate the location of the data item in clustered memory cache 22. The requesting client would then access the item from its location in the cache, for example by interacting with the respective memory manager to obtain a read lock and perform an RDMA read of the cached item.

Continuing with FIG. 5, if it cannot be determined from the local store that the requested item is or had been cached in the shared memory resource, method 120 may include a determination of whether the item is eligible for caching, as shown at 130. Referring again to FIG. 1, client 32 and its policy engine 94 provide examples of components configured to make the eligibility determination of step 130. Specifically, as discussed above, the client and policy engine may filter the passing of requests to metadata service 30, and thereby filter the usage of clustered memory cache.

If the requested item is not eligible for caching, the request is satisfied by means other than through the clustered memory cache. In particular, as shown at 132, the client request is satisfied through auxiliary access, for example by directly accessing a back-end file system residing on auxiliary store 50 (FIG. 1).

Proceeding to 134, a metadata service may be accessed for eligible requests that cannot be initiated with locally stored metadata. Similar to the inquiry at step 124, the metadata service is queried at 136 to determine whether metadata exists corresponding to the client request. If the metadata service has current metadata for the request (e.g., the address of a local memory manager overseeing a portion of cache 22 where the requested item is cached), then the metadata is returned to the requesting entity (138), and the access and read operations may proceed as described above with reference to steps 126 and 128.

The absence of current metadata at the queried metadata service is an indication that the requested item is not present in the shared memory resource (e.g., clustered memory cache 22 of FIG. 1 does not contain a non-stale copy of a file requested by one of clients 32). Accordingly, as shown at 140, method 120 may include determining whether an attempt will be made to insert the requested item into the shared memory. If the item will not be inserted, the client request may be serviced other than through use of the shared resource, as previously described and shown at 132.

Continuing with FIG. 5, if an insertion is to be made, method 120 may include determining the locality of the insertion, as shown at 142. More particularly, an assessment may be made as to a specific location or locations within the shared memory resource where the item is to be placed.

As in the various examples discussed with reference to FIG. 1, the locality determination may be made based on various parameters and in accordance with system policy configurations. In some cases, locality will also be determined in response to data gathered during operation, for example usage statistics accumulated at a metadata service based on reports from memory managers.

As also shown at 142, the cache insertion may also include messaging or otherwise conferring with one or more local memory managers (e.g., memory managers MM1, MM2, etc. of FIG. 1). This communication may include requests, acknowledgments and the like. As an illustration, metadata service 30 might determine, based on usage statistics and certain metadata, to attempt to cache a requested block of data in a memory location managed by memory manager MM4. Metadata service 30 would send the insertion request to memory manager MM4, which could then grant the request and permitted the requested block to be written into its managed memory location 24. The interaction of metadata service 30 and memory manager MM4 can also include receiving an acknowledgment at the metadata service, as shown at 144.

As previously discussed, the memory manager in some cases may deny the insertion request, or may honor the request only after performing an eviction or other operation on its managed memory location(s). Indeed, in some cases, insertion requests will be sent to different memory managers, successively or in parallel, before the appropriate insertion location is determined. In any event, the insertion process will typically also include updating the metadata service data store, as also shown at 144. For example, in the case of a cached file, the data store 80 of metadata service 30 (FIG. 1) may be updated with a hash of the path/filename for the file.

As shown at 146, if the insertion is successful, metadata may be provided to the client and the access and read operations can then proceed (138, 126, 128). On the other hand, failed insertion attempts may result in further attempts (142, 144) and/or in auxiliary access of the requested item (132).

Client Configuration: Libraries, Drivers, Virtual Memory, Page Fault Handling

Figure 6:
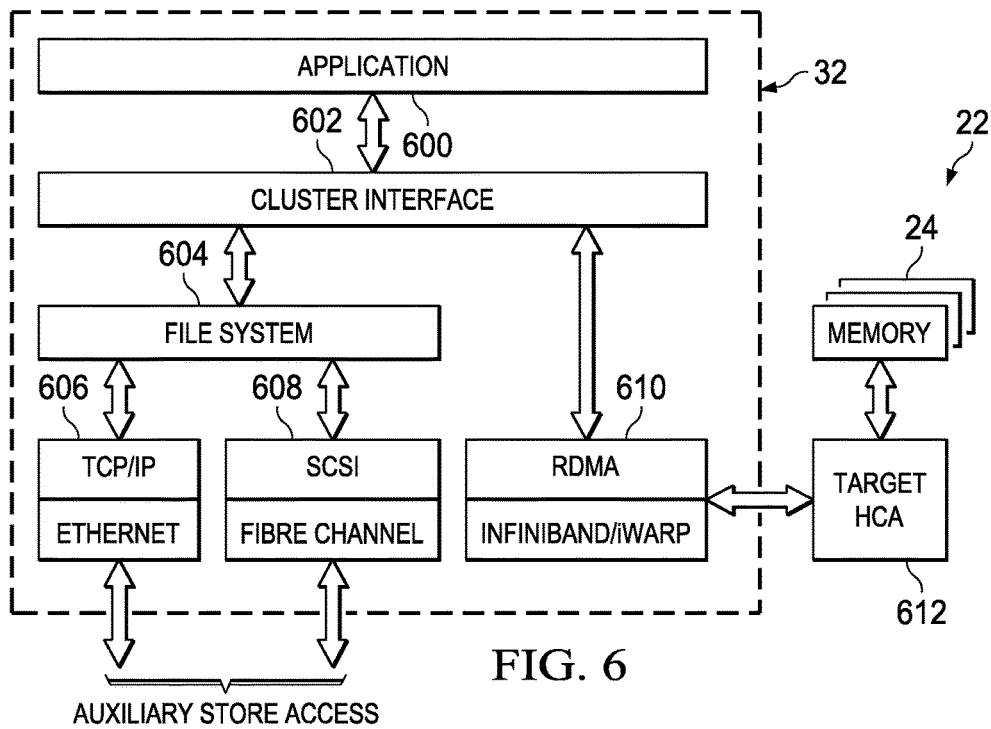
FIGS. 6 and 7 are block diagrams of examples of communication stack configurations that may be employed to enable devices to access a distributed shared memory resource according to some embodiments.
Figure 7:
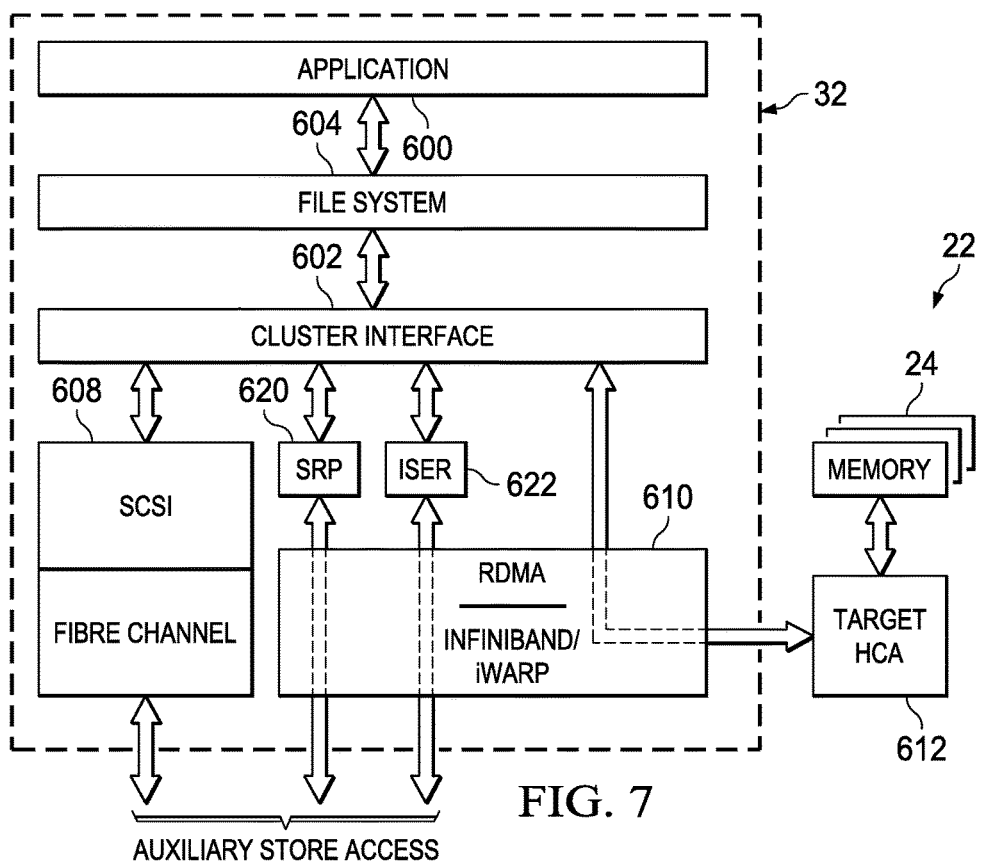

Referring now to FIGS. 6 and 7, the figures depict exemplary architectures that may be employed to provide clients 32 with access to the shared memory resource(s). The figures depict various components of client 32 in terms of a communications stack for accessing data items, and show access pathways for reading data items from an auxiliary store (e.g., auxiliary store 50 of FIG. 1) or from a clustered memory resource (e.g., clustered memory cache 22 of FIG. 1), which typically provides faster and more efficient access than the auxiliary store access.

In the example of FIG. 6, cluster interface 602 is disposed in the communications stack between application 600 and file system abstraction layer 604. Auxiliary store access may be made by the file system layer through known mechanisms such as TCP/IP—Ethernet layers 606, SCSI—Fibre Channel layers 608, and the like. As discussed above, auxiliary store access may occur for a variety of reasons. The file requested by application 600 might be of a type that is not eligible for loading into clustered memory cache. Cluster interface 602 may apply a filter that blocks or prevents access to the shared memory resource, as in step 130 of the exemplary method of FIG. 5. Alternatively, auxiliary store access may be performed after a failed cluster insertion attempt, as shown at steps 146 and 132 of FIG. 5.

Alternatively, cluster interface 602 is configured to bypass file system layer 604 in some cases and read the requested data from a location in the shared memory resource (e.g., a memory location 24 in clustered memory cache 22), instead of from the auxiliary store 50. As indicated, this access of the clustered resource may occur via a client RDMA (over Infiniband/iWarp/RoCE) layer 610 and a target host channel adapter 612.

Cluster interface 602 may perform various functions in connection with the access of the shared memory resource. For example, interface 602 may search for and retrieve metadata in response to a request for a particular file by application 600 (e.g., as in step 124 or steps 134, 136 and 138 of FIG. 5). Interface 602 may also interact with a metadata service to insert a file into the clustered cache, and then, upon successful insertion, retrieve metadata for the file to allow the cluster interface 602 to read the file from the appropriate location in the clustered cache.

In one example embodiment, cluster interface 602 interacts with the virtual memory system of the client device, and employs a page-fault mechanism. Specifically, when a requested item is not present in the local memory of the client device, a virtual memory page fault is generated. Responsive to the issuance of the page fault, cluster interface 602 performs the previously described processing to obtain the requested item from the auxiliary store 50 or the shared memory cluster. Cluster interface 602 may be configured so that, when use of the clustered cache 22 is permitted, item retrieval is attempted by the client simultaneously from auxiliary store 50 and clustered memory cache 22. Alternatively, attempts to access the clustered cache 22 may occur first, with auxiliary access occurring only after a failure.

FIG. 7 alternatively depicts a block-based system, where cluster interface 602 is positioned between the file layer 604 and block-based access mechanisms, such as SCSI—Fibre Channel layer 608 and SRP 620, ISER 622 and RDMA—Infiniband/iWarp (or RoCE) layers 610. In this example, the mechanisms for storing and accessing blocks are consistent with the file-based example of FIG. 6, though the data blocks are referenced from the device with an offset and length instead of via the file path. In particular embodiments, application 600 may be a virtual machine. Additionally, cluster interface 602 may be part of a virtual appliance with which a virtual machine communicates. In particular embodiments, a combination of iSER and RDMA transports may be used (in conjunction with iSER target devices in the virtual machine). In yet other embodiments, a native driver (operable to function with cache cluster 22) may be placed inside a hypervisor itself, and may use the RDMA stack instead of iSER in its data path. In these example embodiments, I/O flows from a virtual machine file system (e.g., 604) to a native driver and then to a local memory manager 34, for example, running inside a virtual machine.

Depending on the particular configuration employed at the client, block-level or file-level invalidation may be employed. For example, in the event that an application is writing to a data item that is cached in the clustered resource, the cached copy is invalidated, and an eviction may be carried out at the local memory/cache manager in the cluster where the item was stored. Along with the eviction, messaging may be sent to clients holding references to the cached item notifying them of the eviction. Depending on the system configuration, the clients may then perform block or file-level invalidation.

Furthermore, it will be appreciated that variable block sizes may be employed in block-based implementations. Specifically, block sizes may be determined in accordance with policy specifications. It is contemplated that block size may have a significant effect on performance in certain settings.

Finally, configurations may be employed using APIs or other mechanisms that are not file or block-based.

Load Balancing: Reclaimable Block Migration

In various implementations, systems and methods described herein may be configured to place new cache blocks with a round-robin mechanism or the like—which usually results in a fairly even distribution of blocks across cache devices 24. However, when cache devices are added, removed, and/or fail (such that there is a change the number of devices in the pool), some cache devices can become very over-utilized or under-utilized. Moreover, these non-ideal conditions can persist until the normal eviction and recreation process results in enough new block placement operations to fill the under-utilized devices, thus relieving the space pressure on the over-utilized devices. Unfortunately, the normal eviction and recreation process can take a long time to complete, and, while it is happening, cache performance is impaired by its backing store operations (e.g., flushing, filling, and write-through).

As used herein, the term "reclaimable blocks" refers to valid cache blocks (that is, up to date) which can nonetheless be quickly discarded to make space, or quickly made accessible for application I/O to that region of a Logical Unit Number (LUN) (a unique identifier to designate an individual or collection of physical or virtual storage devices that execute I/O commands). As such, reclaimable blocks (or the valid portions thereof) contain an up-to-date copy of that region of the SAN LUN.

Generally speaking, a reclaimable block in any distributed host cache would be free of any states or conditions (e.g., ongoing application or fill/flush I/O, any incomplete internal bookkeeping for the block, locks, etc.) that prevented it from being immediately discarded. For example, in some embodiments, a block may be deemed reclaimable when it has no client read or write references (no application can currently read or write that cache block), is clean, and has no replica block. If any of these conditions is not true, a block is instead deemed to be "active".

A reclaimable block can be freed immediately and its cache device space reused for a different cache block (or a replica of some other cache block). A reclaimable block can also be made readable and writable (with certain restrictions) again by any client with very little delay—at which point, however, the block then has a client reference and is deemed active and no longer "reclaimable" (once any client gets a reference on a block, then that cache block is no longer in the reclaimable list). Specifically, the use of reclaimable blocks may avoid the delay of allocation, and any eviction required to accomplish that (or the risk that eviction will fail and force us to fall back to slower mechanisms to access that region of the SAN LUN). If a reclaimable block is already completely valid (say, because the last client was reading it), it also avoids the delay of a fill read.

This "completely valid" condition refers to the ways the up-to-date contents of the cache block arrive there. If an application reads from a cache block, the cache server must fill the whole block from the SAN LUN, and the block becomes completely valid. To clarify, the application generally reads only a portion of a cache block. Generally, a typical size of a cache block may be many times larger than a client read portion (e.g., 512k bytes; which indicates why cache blocks may be in a partially valid state). In some embodiments, selective incremental filling may be used such that reads do not cause a whole block to become valid.

If the first access to a cache block is a write, it is created (in WRITE ONLY mode) in a completely invalid state in which none of its regions are consistent with the SAN LUN. The regions the application writes to become valid, and are eventually flushed to the SAN LUN. After some number of writes and no reads, the block is probably still only partially valid. Now when an application needs to read from that cache block, the cache server must fill the invalid portions of the cache block from the SAN LUN (converting the WRITE ONLY block to a READ WRITE block). At that time we may discover the whole block has been written to and no fill read is necessary. More commonly, some portion of the block must be read. Blocks that become reclaimable may or may not be completely valid. If the next access to a reclaimable block is a read, the fill step still has to be done as the block becomes active again, but there will be less fill work to do than if the block had not already existed because portions of the block are already valid.

In short, systems and methods described herein may include a mechanism for maintaining a pool of quickly reusable cache blocks on each cache device to satisfy requests to create blocks not already in the cache. This is called the "reclaimable list." The contents of these reusable blocks are preserved until it they are actually reused, so demand for that same cached region can be satisfied without any backing store I/O.

Figure 8:
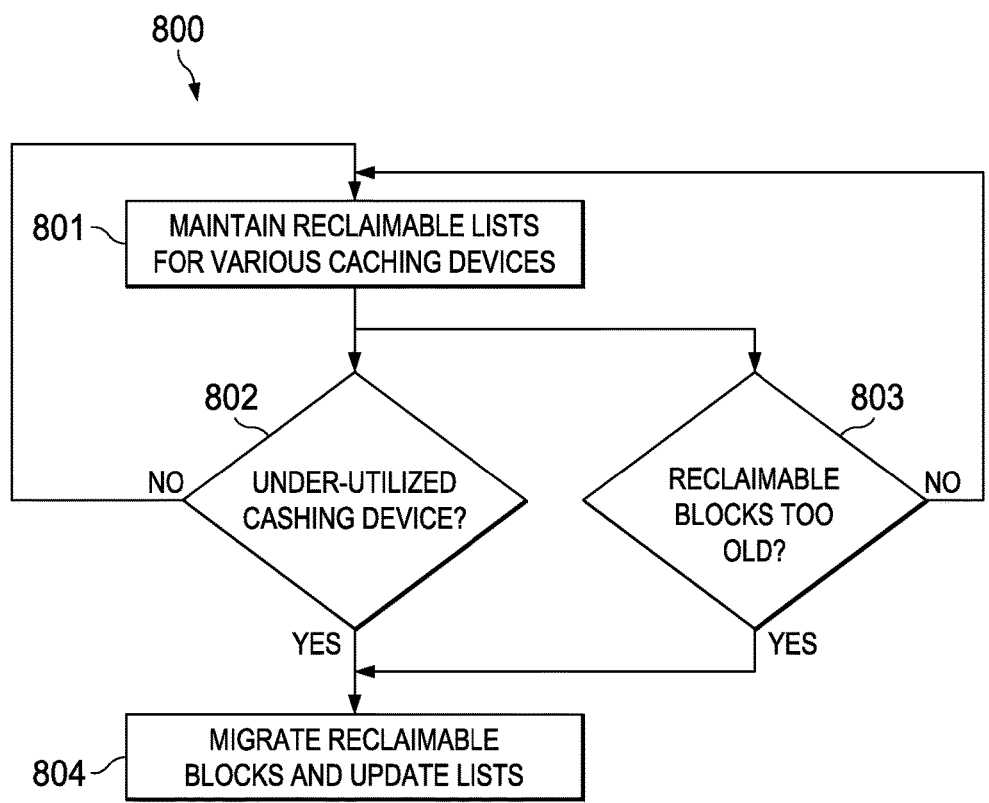
FIG. 8 is a flowchart of an example of a method for performing cache load balancing by reclaimable block migration according to some embodiments.

FIG. 8 shows method 800 for performing cache load balancing by reclaimable block migration. In various embodiments, method 800 may be performed at least in part, by memory manager 34, configuration managers 42, and/or policy manager 44. For example, configuration managers 42 may distribute cache device utilization and/or reclaimable list age information from each cache server to all the other cache servers, whereas the actual measurements of utilization and reclaimable list age, and the actual reclaimable block migration may be performed by memory manager 34.

At block 801, method 800 includes maintaining reclaimable lists for various caching devices 24. At block 802, method 800 determined whether any under-utilized and over-utilized devices exist in the system and, if so, block 804 performs reclaimable block migration and update operations using a "Space-Based Load Balancing" technique; otherwise control returns to block 801. At block 803, method 800 determined whether older reclaimable blocks exist in the system and, if so, block 804 performs reclaimable block migration and update operations using an "Age-Based Load Balancing" technique; otherwise again control returns to block 801.

The "Space-Based Load Balancing" technique and the "Age-Based Load Balancing" technique are each described in turn below, followed by a discussion of various implementation considerations, as well as a couple of operational examples.

Space-Based Load Balancing

A cache space balancing technique discussed herein adds a mechanism for advertising under-utilized cache devices to other cache devices with high utilization. For example, memory manager 34 may advertise utilization of each cache device that it manages and the reclaimable blocks for each cache device. When a cache device with high utilization places a block on its reclaimable list (or notices a reclaimable block and a migration opportunity for any other reason), memory manager 34 may notify a selected under-utilized cache device about this block. The IHS hosting the under-utilized device may then trigger the block migration mechanism to move the reclaimable block to its under-utilized device. Each successfully migrated reclaimable block is an avoided cache block eviction, with corresponding avoided backing store reads.

Each time this happens, the under-utilized device becomes a little more utilized, and the highly utilized device gains a little free space. As more blocks are created on all cache devices, some free space is consumed by these new blocks. On the highly utilized cache devices this will cause the reclaimable list mechanism to request all clients to release some of their least recently used references on blocks in that cache device. As these blocks are dereferenced and become reclaimable, they too will become targets for migration. This way the space pressure on highly utilized devices results not in eviction, but in migration to another cache device with free space.

In various implementations, such a space-based load balancing mechanism is best-effort, and failure to migrate a reclaimable block has no adverse consequences beyond the backing I/O not avoided.

Age-Based Load Balancing

In various implementations, loading balancing efforts may be performed even in the absence of under-utilized cache devices. For example, a mechanism that advertises the under-utilized cache devices to all cache servers may also advertise the ages of the oldest reclaimable blocks (least recently made reclaimable) on each cache device. Cache devices with the least recently reclaimable (the ones that have been reclaimable the longest) blocks can free a number of them, making migration opportunities (space) for more recently referenced reclaimable blocks on other cache devices. The time spent by the block on the reclaimable list may be preserved when reclaimable blocks are migrated. In this manner, the most recently referenced cache blocks may be preserved in the cache wherever that space happens to be.

Additionally or alternatively, age-based load balancing may be used instead of space-based balancing. Over-utilized cache devices tend to have very recently added blocks on their reclaimable lists, while under-utilized ones tend to have reclaimable blocks that have been there longer (or have no reclaimable blocks, which we can treat as infinitely old). If cache servers simply seek to migrate newer reclaimable blocks to themselves, freeing their oldest reclaimable blocks if necessary to do so, an empty cache device will gradually fill itself with the most recently reclaimable blocks from around the cluster. Once full, the balancing will continue so the oldest reclaimable blocks may be replaced by newer ones throughout the cluster.

VARIANTS AND IMPLEMENTATION

In some implementations, the age-based load balancing technique may be used first, and the space-based technique may be used an alternative approach.

Because reclaimable blocks may be placed in a list, with the newest arrivals on one end and the oldest on the other, the oldest reclaimable block is readily identified. For example, an entry stat for each block may be added and used to indicate when the block became reclaimable. This timestamp can be converted into an age when communicating with other IHSs, and then back into a time when a block is migrated in—which overcomes the problem of every device's zero timestamp being a different absolute time.

In some cases, a predetermined number of reclaimable blocks may be placed at the "new" end of the reclaimable list (blocks used by write-same, for example) so they get reused ahead of those that involve backing store work to create. In some situations, a policy mechanism may be used to avoid migrating these block unless there were no other reclaimable blocks that are not in the "early reuse" category, or a lot of them would get migrated at the expense of better choices to remain reclaimable.

Still referring to age-based balancing, a cutoff may be implemented for the age difference below which we it is not worth migrating reclaimable blocks. In some cases, the cutoff may be many minutes.

Moreover, a migrated block may be inserted in the reclaimable list of the destination in order by age with the rest of the population. Otherwise, if migrated blocks are added at the old end of a list, the list appears to have the newest reclaimable blocks (our older ones become hidden). Conversely, if migrated blocks are added to the new end of a list, they may actually be older than the newest reclaimable blocks on the list, and it may cause those to get recycled or migrated away instead. Therefore, to find its right position on the list, an algorithm may walk down the list one by one, or in any other suitable manner. For instance, an aggregate structure (such as a tree or the like) for the reclaimable pool may be used.

With space-based balancing, thresholds may be used for both the "to" and "from" cutoff decision. That is, if a cache device is less that x % full, it is not worth migrating reclaimable blocks away from it. If the cache device is more than y % full, it is not worth migrating reclaimable blocks to it.

In some cases, when a cache server chooses a block to adopt, the cache server it is adopting from can optionally give it a "better" block. That is, if server A decides that server B has block X with age Y that's a good candidate for server A to adopt, when server A asks server B for block X, server B can give server A block Z instead, as long as block Z is not older than age Y of block X. In other cases, cache server A may ask for any block from cache server B that meets a given age criteria.

Space-Based Example

To illustrate the mechanism for Space-Based techniques discussed above, consider the following example. At time=0,

TABLE I

Time = 0

| Dev | % F | % F + R | Adv | Reclaim (old . . . new) |
|---|---|---|---|---|
| 1.A | 0 | 1 | 9 | b0,9 b1,9 b2,8 b3,1 |
| 1.B | 0 | 1 | 7 | b10,7 b11,7 b12,5 |
| 2.A | 0 | 1 | 50 | b20,50 b21,15 b22,2 |
| 2.B | 0 | 1 | 15 | b30,15 b31,15 b32,10 |

In Table 1, each row represents a different caching device. As to the columns, "Dev" indicates a caching device ID using a <server#>.<storage_device#> nomenclature (for purposes of simplicity, it is assumed that all caching devices have the same storage capacity or size), "% F" is the percentage of available storage in the device, "% F+R" indicates a percentage of the device that is free or reclaimable, "Adv" is the reclaimable block age advertised by each device (that is, the time its oldest reclaimable block has been reclaimable), and "Reclaim" is the reclaimable list stored on that device, from oldest to newest. Each block on a given reclaimable list is listed with a <block#>,<age> nomenclature, where <age> is the time in seconds that <block#> has been reclaimable.

In this example, the "adoption age threshold" (AAT) is the difference in "advertised age" below which the adoption of a block will not occur. That is, someone else's reclaimable block must be AAT seconds less than your advertised age for you to offer to adopt the block, which assume to have a value of 30 seconds. The "adoption space threshold" (AST) is the amount of free space a cache device must have before it will offer to adopt reclaimable blocks of any age, assumed to be 20%. And the "reclaimable threshold" (RT) is the amount of free space plus reclaimable space each cache device tries to maintain for low block allocation latency, assumed to be 10%.

Referring back to Table I, device 2.A has the oldest reclaimable block, and device 1.B has the newest. Device 1.Bs advertised age is 43 seconds less than device 2.A's. When device 2.A notices this, it may offer to adopt a block with age AAT seconds (or more) less than device 2.A's currently advertised age (50-30=20, newer than device 2.A's oldest reclaimable block by an amount of time enough to be worth the overhead).

At time=0.1 seconds,

TABLE II

Time = 0.1

| Device | % F | % F + R | Adv | Reclaim (old . . . new) |
|---|---|---|---|---|
| 1.A | 0 | 1 | 9 | b0,9 b1,9 b2,8 b3,1 |
| 1.B | 0 | 1 | 7 | b11,7 b12,5 |
| 2.A | 0 | 1 | 15 | b21,15 b10,7 b22,2 |
| 2.B | 0 | 1 | 15 | b30,15 b31,15 b32,10 |

As shown in Table II, block b20 on device 2.A has been freed to adopt block b10 from device 1.B (this is not necessarily required, but let us assume that happened here because 2.A did not have space for more than three reclaimable blocks). Block b10 has been inserted into device 2.A's reclaim list in age order (older and newer blocks existed there in this example). Less than one second has elapsed in this example, so all blocks still have the same age. No other changes to the reclaim list have occurred.

No device now has an advertised age AAT seconds larger than any other, so no adoption will begin. At time=1 second,

TABLE III

Time = 1

| Dev | % F | % F + R | Adv | Reclaim (old . . . new) |
|---|---|---|---|---|
| 1.A | 0 | 1 | 10 | b0,10 b1,10 b2,9 b3,2 |
| 1.B | 0 | 1 | 8 | b11,8 b12,6 |
| 2.A | 0 | 1 | 16 | b21,16 b10,8 b22,3 |
| 2.B | 0 | 1 | 16 | b30,16 b31,16 b32,11 |
| 3.A | 100 | 100 | NONE | |
| 3.B | 100 | 100 | NONE | |

Table III shows that 1 second has elapsed since time 0, so all reclaimable blocks are now is older. No changes have occurred to the reclaimable lists on devices 1.A through 2.B.

Moreover, at this time devices 3.A and 3.B have been added, but are completely empty. (Assume these are the same size as all others.) In some implementations, devices with no reclaimable blocks advertise an age of "NONE". Hence, devices 3.A and 3.B will both notice that they have more than AST space free, and will both offer to adopt a block of any age from the device with the least free space (choosing randomly among ties, and excluding devices with the same or more free space as they have). Here devices 1.A through 2.B each have 0% free, so assume device 3.A offers to adopt a block of any age from device 1.B, and device 3.B makes that same offer to device 2.A.

Shortly thereafter, at time=1.1 seconds:

TABLE IV

Time = 1.1

| Dev | % F | % F + R | Adv | Reclaim (old . . . new) |
|---|---|---|---|---|
| 1.A | 0 | 1 | 10 | b0,10 b1,10 b2,9 b3,2 |
| 1.B | 0 | 1 | 6 | b12,6 |
| 2.A | 0 | 1 | 8 | b10,8 b22,3 |
| 2.B | 0 | 1 | 16 | b30,16 b31,16 b32,11 |
| 3.A | 99 | 100 | 8 | b11,8 |
| 3.B | 99 | 100 | 16 | b21,16 |

This may continue until no device has anything reclaimable, or devices 3.A and 3.B had less than AST space free. At time=1.2 seconds:

TABLE V

Time = 1.2

| Dev | % F | % F + R | Adv | Reclaim (old . . . new) |
|---|---|---|---|---|
| 1.A | 1 | 1 | NONE | |
| 1.B | 1 | 1 | NONE | |
| 2.A | 1 | 1 | NONE | |
| 2.B | 1 | 1 | NONE | |
| 3.A | 99 | 100 | 10 | b0,10 b1,10 b2,9 b11,8 b10,8 b22,3 b3,2 |
| 3.B | 99 | 100 | 16 | b21,16 b30,16 b31,16 b32,11 b12,6 |

In Table V, because devices 3.A and 3.B have greater than AST space free, they have both adopted blocks older than their oldest reclaimable blocks.

Even with no I/O in the cluster creating new blocks on devices 1.A through 2.B, those cache servers would try to maintain their RT, so would request their clients to release their oldest blocks to do so. This may continue to make new reclaimable blocks until % F+R reaches the RT (which again we assume here is 10%). Now let us assume that this process continues on for 99 seconds, and by then devices 1.A through 2.B have reached % F+R=RT. Devices 3.A & 3.B would continue to adopt all these reclaimable blocks. Since we are assuming these are all the same size, that could happen and devices 3.A & 3.B would still have greater than AST free space.

At time=100 seconds,

TABLE VI

Time = 100

| Dev | % F | % F + R | Adv | Reclaim (old . . . new) |
|---|---|---|---|---|
| 1.A | 10 | 10 | NONE | |
| 1.B | 10 | 10 | NONE | |
| 2.A | 10 | 10 | NONE | |
| 2.B | 10 | 10 | NONE | |
| 3.A | 79 | 100 | 110 | b0,110 b1,110 b2,109 b11,108 b10,108 b22,103 b3,102 . . . <many much newer blocks> |
| 3.B | 79 | 100 | 116 | b21,116 b30,116 b31,116 b32,111 b12,106 . . . <many much newer blocks> |

Now devices 3.A and 3.B have all the reclaimable blocks in the cluster, and they still have a lot of free space. They each still have the oldest reclaimable blocks they ever acquired, and they will keep them until they evict them to create a new block, or evict them to adopt a newer reclaimable block. If work starts in the cluster again, it will produce a stream of new blocks on all cache devices. It may also result in some reclaimable blocks becoming referenced by clients (and therefore no longer reclaimable).

Assume this scenario goes on for another 100 seconds, by which time devices 3.A and 3.B have less than AST free space and are no longer adopting reclaimable blocks of any age, but only those AAT seconds newer than the oldest one they already have. That is, at time=200 seconds,

TABLE VII

Time = 200

| Dev | % F | % F + R | Adv | Reclaim (old . . . new) |
|---|---|---|---|---|
| 1.A | 0 | 1 | 1 | b6,1 b7,1 b8,1 |
| 1.B | 0 | 1 | 5 | b12,5 b13,1 b14,1 |
| 2.A | 0 | 1 | 5 | b23,5 b24,5 b25,1 |
| 2.B | 0 | 1 | 1 | b33,1 b34,1 |
| 3.A | 20 | 50 | 210 | b0,210 b22,203 b3,202 . . . b4,100 . . . b5,1 . . . <many much newer blocks> |
| 3.B | 20 | 50 | 211 | b32,211 b12,206 . . . <many much newer blocks> |

Here blocks b1,210 b2,209 b11,208 b10,208 b21,216 b30,216 b31,216 were all referenced and are no longer reclaimable. The oldest reclaimable block on device 3.B is now b32, and the advertised age has been adjusted accordingly.

Devices 1.A through 2.B can tell there are currently no other devices with an advertised age greater than AAT seconds less than theirs, so they will not adopt any blocks. Devices 3.A and 3.B both have 4 devices to adopt from. Because they have less than AST free space and are no longer adopting blocks of any age, they ignore the free space on the other cache devices, and choose the one with the highest advertised age that is AAT newer than theirs. Devices 1.B and 2.A are tied, so they choose randomly. Assume device 3.A adopts from device 1.B and device 3.B adopts from device 2.A. At time 200.1 seconds,

TABLE VIII

Time = 200.1

| Dev | % F | % F + R | Adv | Reclaim (old . . . new) |
|---|---|---|---|---|
| 1.A | 0 | 1 | 1 | b6,1 b7,1 b8,1 |
| 1.B | 0 | 1 | 1 | b13,1 b14,1 |
| 2.A | 0 | 1 | 5 | b24,5 b25,1 |
| 2.B | 0 | 1 | 1 | b33,1 b34,1 |
| 3.A | 20 | 50 | 50 | b0,210 b22,203 b3,202 . . . b4,100 . . . b12,5 b5,1 |
| 3.B | 20 | 50 | 50 | b32,211 b12,206 . . . b23,5 |

As new blocks continue to get created and reclaimable blocks continue to be re-referenced, the full cache devices may continue to produce new reclaimable blocks. While old reclaimable blocks remain on devices 3.A and 3.B, newer reclaimable blocks will continue to be adopted there, possibly replacing the old reclaimable blocks. The process continues until less than AAT seconds remain between the advertised reclaimable block age between any two cache devices, at which point migration stops, for example, until the next configuration change or availability event produces another empty cache device.

Age-Based Example

If we omit the use of AST, the previously described example in Tables I-Ill proceeds in the same manner until time=1 second, at which point devices 3.A and 3.B behave differently. Particularly, devices 3.A and 3.B both notice that all other devices have newer reclaimable blocks than they do (since they each have NONE), and that devices 2.A and 2.B are tied for having the oldest. They may each choose randomly between the best candidates. Assume device 3.A chooses device 2.A, and device 3.B chooses device 2.B. Then, at time=1.1 seconds,

TABLE IX

Time = 1.1

| Dev | % F | % F + R | Adv | Reclaim (old . . . new) |
|---|---|---|---|---|
| 1.A | 0 | 1 | 10 | b0,10 b1,10 b2,9 b3,2 |
| 1.B | 0 | 1 | 8 | b11,8 b12,6 |
| 2.A | 0 | 1 | 16 | b10,8 b22,3 |
| 2.B | 0 | 1 | 16 | b31,16 b32,11 |
| 3.A | 99 | 100 | 16 | b21,16 |
| 3.B | 99 | 100 | 16 | b30,16 |

Before devices 3.A and 3.B adopted any blocks, devices 1.A through 2.B each had an advertised age within AAT of each other, so no adoption took place. Now that devices 3.A and 3.B have each adopted something, they too have an advertised age within AST of the other nodes. This would happen as long as the first several reclaimable blocks on any device had about the same age, which is what would be expected with eviction happening uniformly before devices were added.

Therefore, even though 3.A and 3.B have lots of free space, they will not adopt anything from the full cache devices until something changes. If there continues to be load on the system that creates new blocks and makes more reclaimable blocks, some reclaimable blocks on devices 1.A through 2.B may get evicted to make space, and other blocks may take their place on the reclaimable list. Once AAT has gone by, blocks placed on the reclaimable list of devices 1.A through 2.B may be adopted by devices 3.A or 3.B if they are the oldest on the reclaimable list.

Assume that 29 seconds goes by, during which devices 1.A through 2.B are evicting at a fair rate, at time=30 seconds their oldest reclaimable block is now only 10 seconds old:

TABLE X

Time = 30

| Dev | % F | % F + R | Adv | Reclaim (old . . . new) |
|-----|-----|---------|-----|--------------------------|
| 1.A | 0   | 1       | 10  | b4,10 b5,2 b6,2 b7,2     |
| 1.B | 0   | 1       | 9   | b13,9 b14,6              |
| 2.A | 0   | 1       | 1   | b23,1 b24,1              |
| 2.B | 0   | 1       | 5   | b33,5 b34,4              |
| 3.A | 99  | 100     | 46  | b21,46                   |
| 3.B | 99  | 100     | 46  | b30,46                   |

Now devices 3.A and 3.B may adopt from any of the other cache devices, because they have all evicted (or re-referenced) their reclaimable blocks that were less than AAT seconds newer that the advertised ages of devices 3.A and 3.B.

From this point on, the example proceeds as it did above in Tables VII and VIII. This omits the AST logic and the need for each caching device to learn the % F of each other. The only cost is continued eviction by the full cache devices for AAT seconds after an empty cache device is added; although eviction was already happening for some unspecified amount of time before devices 3.A and 3.B arrived anyway.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A computer system, comprising:
   a processor; and
   a memory coupled to the processor, the memory having program instructions stored thereon that, upon execution by the processor, cause the computer system to:
      maintain a first list of reclaimable blocks that reside in a first caching device and a first advertised age for the oldest reclaimable block of the first list;
      maintain a second list of reclaimable blocks that reside in a second caching device and a second advertised age for the oldest reclaimable block of the second list;
      determine that the second advertised age is older than the first advertised age; and
      cause the oldest reclaimable block on the first list to be migrated from the first caching device to the second caching device.

2. The computer system of claim 1, wherein all reclaimable blocks have no read or write references, are clean, and have no corresponding replica blocks.

3. The computer system of claim 1, wherein the first advertised age indicates how long ago the oldest reclaimable block of the first list became reclaimable, and wherein the second advertised age indicates how long ago the oldest reclaimable block of the second list became reclaimable.

4. The computer system of claim 1, wherein the program instructions, upon execution by the processor, further cause the computer system to determine that a difference between the first and second advertised ages is greater than a threshold time value prior to the migration.

5. The computer system of claim 1, wherein the program instructions, upon execution by the processor, further cause the computer system to add a reference to the migrated reclaimable block to the second list and to remove a reference to the migrated reclaimable block from the first list.

6. The computer system of claim 5, wherein the reference to the migrated reclaimable block is added to the second list among other references to other reclaimable blocks in order by age.

7. The computer system of claim 1, wherein the program instructions, upon execution by the processor, further cause the computer system to cause the second caching device to discard the oldest reclaimable block of the second list prior to the migration in response to the second caching device being full.

8. The computer system of claim 7, wherein the program instructions, upon execution by the processor, further cause the computer system to determine that the second caching device has a storage utilization below a maximum threshold level prior to the migration.

9. The computer system of claim 1, wherein the program instructions, upon execution by the processor, further cause the computer system to determine that the first caching device has a storage utilization above a minimum threshold level prior to the migration.

10. The computer system of claim 1, wherein the program instructions, upon execution by the processor, further cause the computer system to update the first and second advertised ages over time.

11. A memory device having program instructions stored thereon that, upon execution by a processor of a computer system, cause the computer system to:
- maintain a first list of reclaimable blocks that reside in a first caching device and a second list of reclaimable blocks that reside in a second caching device, wherein all reclaimable blocks have no read or write references, are clean, and have no corresponding replica blocks;
- determine that the second caching device is under-utilized with respect to the first caching device;
- migrate at least one reclaimable block from the first caching device to the second caching device;
- update the first and second lists of reclaimable blocks;
- maintain a first advertised age for the oldest reclaimable block of the first list, wherein the first advertised age indicates how long ago the oldest reclaimable block of the first list became reclaimable;
- maintain a second advertised age for the oldest reclaimable block of the second list, wherein the second advertised age indicates how long ago the oldest reclaimable block of the second list became reclaimable; and
- determine that the second advertised age is older than the first advertised age.

12. The memory device of claim 11, wherein the second caching device is under-utilized with respect to the first caching device when it has less available storage space than the second caching device.

13. The memory device of claim 11, wherein the program instructions, upon execution by the processor, further cause the computer system to determine that a difference between the first and second advertised ages is greater than a threshold time value prior to the migration.

14. The memory device of claim 11, wherein the program instructions, upon execution by the processor, further cause the computer system to add a reference to the migrated reclaimable block to the second list and to remove a reference to the migrated reclaimable block from the first list after the migration.

15. The memory device of claim 14, wherein the reference to the migrated reclaimable block is added to the second list among other references to other reclaimable blocks in order by age.

16. The memory device of claim 11, wherein the program instructions, upon execution by the processor, further cause the computer system to determine that the first caching device has a storage utilization above a minimum threshold level and that the second caching device has a storage utilization below a maximum threshold level prior to the migration.

17. A method, comprising:
- in a clustered memory cache having a plurality of caching devices, maintain lists of reclaimable blocks that reside in each caching device, wherein all reclaimable blocks have no read or write references, are clean, and have no corresponding replica blocks;
- migrating a subset of the reclaimable blocks among two or more caching devices to effect a load balancing operation;
- maintaining a first list of reclaimable blocks that reside in a first caching device and a second list of reclaimable blocks that reside in a second caching device;
- determining that the second caching device is under-utilized with respect to the first caching device;
- maintaining a first advertised age for the oldest reclaimable block of the first list, wherein the first advertised age indicates how long ago the oldest reclaimable block of the first list became reclaimable;
- maintaining a second advertised age for the oldest reclaimable block of the second list, wherein the second advertised age indicates how long ago the oldest reclaimable block of the second list became reclaimable;
- determining that the second advertised age is older than the first advertised age;
- migrating at least one reclaimable block from the first caching device to the second caching device; and
- updating the first and second lists of reclaimable blocks.

* * * * *